United States Patent
Das et al.

(10) Patent No.: US 11,941,014 B1
(45) Date of Patent: Mar. 26, 2024

(54) VERSIONED METADATA MANAGEMENT FOR A TIME-SERIES DATABASE

(71) Applicant: Amazon Technologies, Inc., Seattle, WA (US)

(72) Inventors: Sudipto Das, Redmond, WA (US); Kanishka Chaturvedi, Seattle, WA (US); Timothy A Rath, Olympia, WA (US); Avinash Goutham Reddy Aluguvelly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 17/349,786

(22) Filed: Jun. 16, 2021

(51) Int. Cl.
*G06F 16/2458* (2019.01)
*G06F 11/14* (2006.01)
*G06F 16/22* (2019.01)
*G06F 16/27* (2019.01)

(52) U.S. Cl.
CPC ...... *G06F 16/2477* (2019.01); *G06F 11/1469* (2013.01); *G06F 16/2246* (2019.01); *G06F 16/2282* (2019.01); *G06F 16/27* (2019.01); *G06F 2201/84* (2013.01)

(58) Field of Classification Search
CPC ............. G06F 16/2477; G06F 11/1469; G06F 16/2246; G06F 16/2282; G06F 16/27; G06F 2201/84
USPC ........................................................ 707/679
See application file for complete search history.

(56) References Cited

U.S. PATENT DOCUMENTS

| | | | |
|---|---|---|---|
| 7,979,439 B1 | 7/2011 | Nordstrom et al. | |
| 8,132,046 B2 | 3/2012 | Varghese | |
| 8,161,448 B1 | 4/2012 | Croix et al. | |
| 8,219,581 B2 | 7/2012 | Roy et al. | |
| 8,276,154 B2 | 9/2012 | Toub et al. | |
| 8,335,765 B2 | 12/2012 | Sivasubramanian et al. | |

(Continued)

FOREIGN PATENT DOCUMENTS

WO   2015070232   5/2015

OTHER PUBLICATIONS

U.S. Appl. No. 16/116,791, filed Aug. 29, 2018, Mustafa Ozan Ozen, et al.

(Continued)

*Primary Examiner* — Michael Pham
(74) *Attorney, Agent, or Firm* — Robert C. Kowert; Kowert, Hood, Munyon, Rankin & Goetzel, P.C.

(57) ABSTRACT

Methods, systems, and computer-readable media for versioned metadata management for a time-series database are disclosed. A metadata service of a distributed time-series database stores, to one or more metadata storage resources, first metadata descriptive of a table. The first metadata is associated with a version number in a logical sequence for the table. The metadata service stores, in a log, data indicative of one or more metadata updates for the table. The metadata update(s) are associated with an additional version number higher than the version number in the logical sequence. Responsive to a read request, the metadata service determines a most recent version number that has been applied from the log to the metadata storage resource(s). Responsive to the read request and based (at least in part) on the most recent version number, the metadata service returns either the first metadata or second metadata comprising the update(s).

20 Claims, 15 Drawing Sheets

(56) References Cited

U.S. PATENT DOCUMENTS

| | | |
|---|---|---|
| 8,386,540 B1 | 2/2013 | McAlister et al. |
| 8,595,547 B1 | 11/2013 | Sivasubramanian et al. |
| 8,601,112 B1 | 12/2013 | Nordstrom et al. |
| 8,930,312 B1 | 1/2015 | Rath et al. |
| 9,069,827 B1 | 6/2015 | Rath et al. |
| 9,286,001 B2 | 3/2016 | Skjolsvold et al. |
| 9,449,122 B2 | 9/2016 | Haas et al. |
| 9,607,019 B1 | 3/2017 | Swift et al. |
| 9,607,067 B2 | 3/2017 | Haas et al. |
| 9,626,374 B2 | 4/2017 | Hirsch et al. |
| 9,672,257 B2 | 6/2017 | Tobin et al. |
| 9,773,015 B2 | 9/2017 | Guo et al. |
| 9,817,727 B2 | 11/2017 | McAlister et al. |
| 9,836,492 B1 | 12/2017 | Hermanson |
| 9,934,107 B1 | 4/2018 | Chikkanayakanahally et al. |
| 10,007,513 B2 | 6/2018 | Malladi et al. |
| 10,400,583 B1 | 9/2019 | Ricker et al. |
| 10,459,827 B1 | 10/2019 | Aghdaie et al. |
| 10,997,137 B1 | 5/2021 | Goyal et al. |
| 11,461,347 B1 | 10/2022 | Das et al. |
| 2004/0128314 A1 | 7/2004 | Katibah et al. |
| 2011/0083046 A1 | 4/2011 | Andrade et al. |
| 2011/0282836 A1 | 11/2011 | Erickson et al. |
| 2012/0179791 A1 | 7/2012 | Little |
| 2013/0110781 A1 | 5/2013 | Golab et al. |
| 2013/0339371 A1 | 12/2013 | Hayashi et al. |
| 2014/0136563 A1 | 5/2014 | Pompey et al. |
| 2014/0156806 A1 | 6/2014 | Karpistsenko et al. |
| 2014/0236890 A1 | 8/2014 | Vasan et al. |
| 2014/0297585 A1 | 10/2014 | Chawda et al. |
| 2015/0081719 A1 | 3/2015 | Ray et al. |
| 2015/0134795 A1 | 5/2015 | Theimer et al. |
| 2015/0134796 A1 | 5/2015 | Theimer et al. |
| 2015/0149413 A1 | 5/2015 | Lee et al. |
| 2016/0357828 A1 | 12/2016 | Tobin et al. |
| 2017/0060574 A1 | 3/2017 | Malladi et al. |
| 2017/0075965 A1* | 3/2017 | Liu .................... G06F 16/2386 |
| 2017/0103103 A1 | 4/2017 | Nixon et al. |
| 2017/0161661 A1 | 6/2017 | Dannecker et al. |
| 2017/0177546 A1 | 6/2017 | Heinz et al. |
| 2017/0228257 A1 | 8/2017 | Dong et al. |
| 2017/0228405 A1 | 8/2017 | Ward et al. |
| 2017/0262469 A1 | 9/2017 | Ganti et al. |
| 2018/0188045 A1 | 7/2018 | Wheeler et al. |
| 2018/0189337 A1 | 7/2018 | Milby |
| 2018/0232422 A1 | 8/2018 | Park et al. |
| 2018/0246934 A1 | 8/2018 | Arye et al. |
| 2019/0059524 A1 | 2/2019 | Minato et al. |
| 2019/0065278 A1 | 2/2019 | Jeuk et al. |
| 2019/0250819 A1 | 8/2019 | Jain et al. |
| 2020/0110733 A1* | 4/2020 | Gattu .................... G06F 16/219 |
| 2020/0167360 A1 | 5/2020 | Rath et al. |
| 2020/0167361 A1 | 5/2020 | Princehouse et al. |
| 2020/0264860 A1 | 8/2020 | Srinivasan et al. |
| 2020/0310654 A1 | 10/2020 | Meiri et al. |

OTHER PUBLICATIONS

U.S. Appl. No. 16/176,629, filed Oct. 31, 2018, Dumanshu Goyal.

U.S. Appl. No. 16/216,580, filed Dec. 11, 2018, Dumanshu Goyal et al.

Anonymous, "Amazon Kinesis Streams: Developer Guide", Dated Nov. 16, 2017, From http://web.archive.org/web/20171116223501if_/http://docs.aws.amazon.com:80/streams/latest/dev/kinesis-dg.pdf, pp. 1-143.

Anonymous, Amazon Kinesis Firehose: Developer Guide, dated Oct. 25, 2017, From http://web.archive.org/web/20171025072815if_/http://docs.aws.amazon.com:80/firehose/latest/dev/firehose-dg.pdf, p. 1-66.

U.S. Appl. No. 16/199,078, filed Nov. 23, 2018, Timothy A. Rath et al.

U.S. Appl. No. 16/199,102, filed Nov. 23, 2018, Lonnie J. Princehouse et al.

U.S. Appl. No. 16/199,103, filed Nov. 23, 2018, Timothy A. Rath et al.

U.S. Appl. No. 16/219,686, filed Dec. 13, 2018, Dumanshu Goyal et al.

U.S. Appl. No. 16/267,330, filed Feb. 4, 2019, Dumanshu Goyal.

U.S. Appl. No. 16/287,822, filed Feb. 27, 2019, Dumanshu Goyal.

U.S. Appl. No. 16/453,914, filed Jun. 26, 2019, Gaurav Saxena et al.

U.S. Appl. No. 16/455,591, filed Jun. 27, 2019, Gaurav Saxena, et al.

U.S. Appl. No. 16/579,715, filed Sep. 23, 2019, Dumanshu Goyal.

U.S. Appl. No. 16/579,717, filed Sep. 23, 2019, Dumanshu Goyal et al.

U.S. Appl. No. 16/831,637, filed Mar. 26, 2020, Dumanshu Goyal et al.

U.S. Appl. No. 16/831,608, filed Mar. 26, 2020, Dumanshu Goyal.

U.S. Appl. No. 16/831,614, filed Mar. 26, 2020, Dumanshu Goyal et al.

U.S. Appl. No. 16/831,599, filed Mar. 26, 2020, Dumanshu Goayl et al.

U.S. Appl. No. 16/910,858, filed Jun. 24, 2020, James Christopher Sorenson et al.

U.S. Appl. No. 17/349,790, filed Jun. 16, 2021, Sudipto Das et al.

* cited by examiner

US 11,941,014 B1

VERSIONED METADATA MANAGEMENT FOR A TIME-SERIES DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
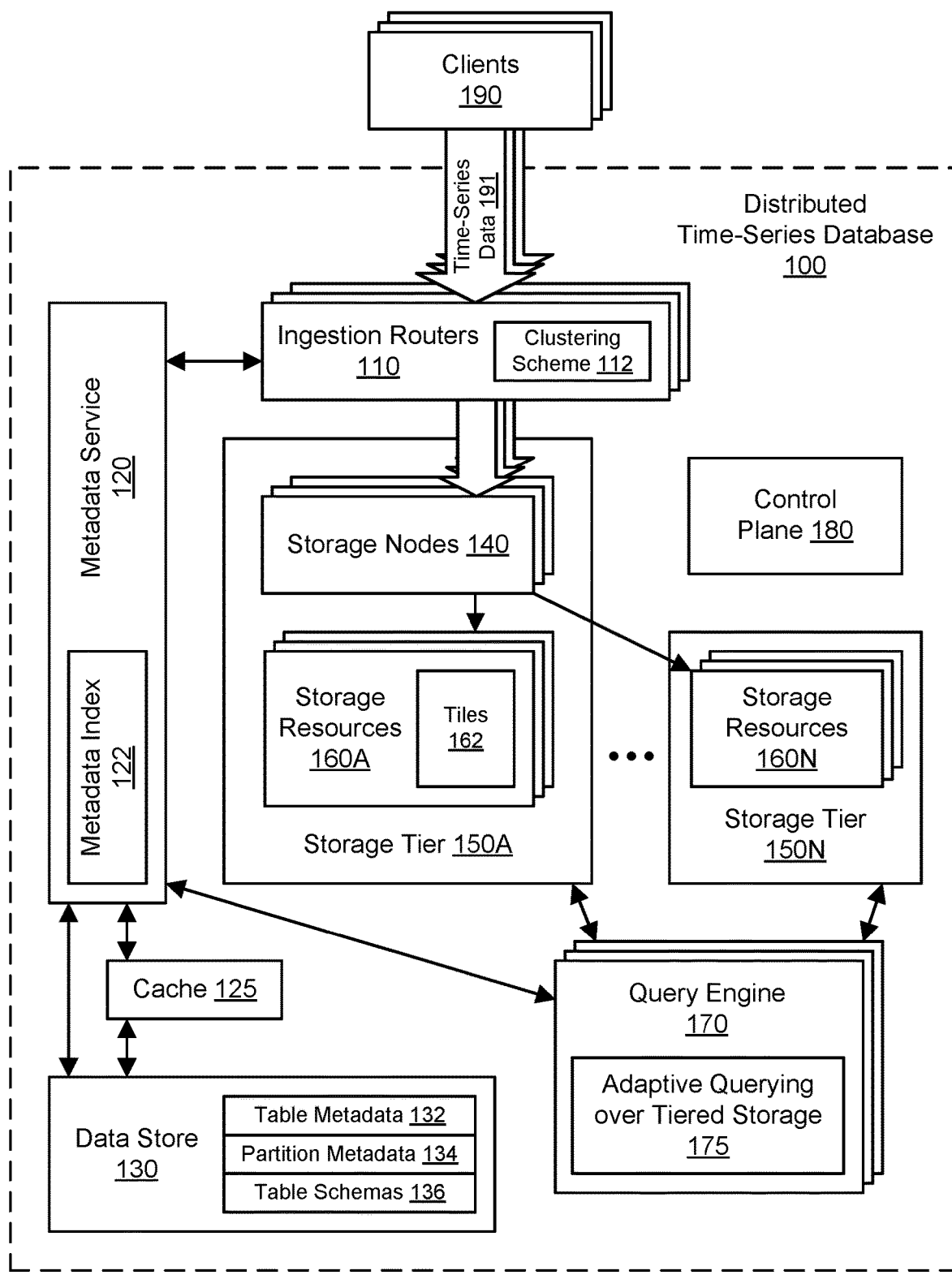
FIG. 1 illustrates an example system environment for a time-series database with adaptive querying of time-series data over tiered storage, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for adaptive querying of time-series data over tiered storage are described. A distributed time-series database hosted in the cloud may offer high availability and high throughput for both ingestion and queries of time-series data on behalf of multiple clients. The time-series database may include a set of ingestion routers that receive and spatially partition time-series data into a set of non-overlapping partitions. A particular time series may be defined by a schema that includes components such as one or more dimension names and a measure name. The time-series database may further include a set of storage nodes that process the partitioned time-series data. The storage nodes may write elements of time-series data to a plurality of storage tiers that differ in storage format, performance characteristics, and/or access characteristics. For example, the storage nodes may write time-series data to a "hot" storage tier (also referred to as a memory store) that offers low-latency and high-availability write and read access to a set of distributed storage resources. In the hot tier, time-series data may be stored in memory using two-dimensional tiles which are defined by spatial and temporal boundaries. As another example, the storage nodes may write time-series data to a "cold" storage tier (also referred to as a magnetic store) that offers higher-latency write and read access to files or other storage objects in persistent storage, e.g., hard-drive storage managed by a cloud storage service.

The time-series database may include a query engine (e.g., using a set of query processors) that implements customer queries of the time-series data across the plurality of storage tiers. The time-series database may elastically scale the resources allocated to a specific customer, e.g., using a distributed control plane that manages a "warm" (or pre-configured) pool of resources. Such resources may be allocated to execute queries that scale independently of the resources allocated for ingestion and storage of time-series data. The query resources may scale based (at least in part) on the query volume and amount of data analyzed by the queries. Time-series data may be migrated automatically from one storage tier to another storage tier by the time-series database, e.g., from the hot tier to the cold tier over time based (at least in part) on a retention policy for a customer table. However, a customer query may be written on a logical view of time-series data that is independent of the underlying storage in the various storage tiers. A particular query may ask for time-series data that happens to be stored in two or more storage tiers. Differences between the storage formats and access characteristics of different storage tiers may pose challenges for performing queries that involve two or more storage tiers.

The aforementioned challenges, among others, are addressed by embodiments of the techniques described herein, whereby adaptive querying may be performed for time-series data over a plurality of storage tiers. Based (at least in part) on the tables referenced in a query and the predicates in the query, the query engine may consult with a metadata service to identify which partitions are relevant to answer the query. During query planning, the query engine may interact with the metadata service to prune out irrelevant partitions and process the partitions relevant to the query. The query engine may determine which storage tier(s) host the partitions relevant to the query. The query engine may adaptively determine how to read the underlying data from different storage tiers according to the different storage formats, storage technologies, access interfaces, and/or access characteristics of the storage tiers. By converting data to a common format, the query engine may merge the results from the one or more storage tiers into the appropriate internal view to create a unified logical representation of the time-series data that is relevant to the query. By automatically translating between the logical representation of time-series data and the underlying physical storage of that data, the query engine may allow customers to write queries in a consistent manner, regardless of the differences between storage tiers in which their data is stored.

Embodiments of methods, systems, and computer-readable media for versioned metadata management for a time-series database are described. A metadata service may authoritatively, consistently, and durably store the metadata of time-series data. The metadata may include, for example, user-defined retention bounds and policies, the mapping of partitions to storage locations in storage tiers, table schemas (e.g., the columns and their data types as inferred upon ingestion and not necessarily explicitly defined by users), the mapping of a measure name to one or more sets of dimension names that may be used to create a time-series view for customers, and so on. The metadata for a table may change over time. For example, as new data points are ingested, the time-series database may determine that a new column has been added. As another example, the storage locations of time-series data points may change as partitions are split or merged or as data points are migrated from one storage tier to another storage tier according to a retention policy for the table. As the metadata changes, it is important to ensure that metadata consumers such as a query engine are able to perform tasks correctly.

The aforementioned challenges, among others, are addressed by embodiments of the techniques described herein, whereby a distributed time-series database may maintain multiple versions of time-series metadata using version management techniques. For a given table, a metadata service may store different versions of metadata using monotonically increasing version numbers in a logical sequence for a table. Write requests for metadata updates to a table may be routed to a write-ahead log that stores the metadata updates for a new version number in the logical sequence. A log applier may then apply the metadata updates to metadata storage resources (such as a cache and/or a persistent data store) to store a new metadata version associated with the new version number. Different versions of the metadata may be stored concurrently using various metadata storage resources. Different selections of the metadata may be stored concurrently using various metadata storage resources. A read request for metadata may be processed using the most recently applied metadata version or a specified version number. A point-in-time restore request or a replication request may be processed using any version number specified by the request, e.g., to restore a failed cache node.

As one skilled in the art will appreciate in light of this disclosure, embodiments may be capable of achieving certain technical advantages, including some or all of the following: (1) improving the latency of performing queries in a distributed time-series database by adaptively performing queries based on the storage tier in which the requested data is stored; (2) improving the latency of writing queries in a distributed time-series database by allow customers to write queries in a consistent manner, regardless of the differences between storage tiers in which their data is stored; (3) improving the availability and latency of a distributed time-series database for queries by using a metadata index to determine the underlying storage resources to which queries are routed; (4) improving the correctness of queries by using metadata versioning to ensure that queries are performed using the correct set of metadata; (5) improving the durability of a metadata service by using multi-version metadata storage with point-in-time snapshot restoration or replication of specific metadata versions; (6) improving the use of storage by using different metadata storage resources to store different selections of metadata rather than requiring all of the metadata storage resources to store the entire set of metadata; and so on.

FIG. 1 illustrates an example system environment for adaptive querying of time-series data over tiered storage, according to some embodiments. A distributed time-series database 100 may ingest and store time-series data 191 and make the stored data available for queries and other computations and tasks. Elements of the time-series data 191 may be received by the database 100 from clients 190 over time, e.g., as one or more streams of time-series data. Clients 190 may represent various types of client devices that generate or otherwise provide data in various time series to the database 100. A time series may include a set of values that change over time, such as sensor measurements or system metrics, and that are timestamped or otherwise positioned along a temporal axis. For example, a set of client devices 190 may repeatedly gather information such as vibration, temperature, and pressure using sensors. As another example, a set of client devices 190 may detect state transitions, e.g., in a computer network. Client devices 190 that provide the time-series data 191 to the database 100 may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of events per day. As another example, a fulfillment center for an online store may have thousands of sensors that monitor the state of equipment, goods, and software. In order to efficiently ingest, transform, store, and/or query such large quantities of data, the distributed database 100 may employ scaling techniques while keeping the database online for continued ingestion and querying. By decoupling various stages of the distributed database 100 from each other, individual portions of the database may be scaled up or down by a control plane 180 to make better use of computational and storage resources while permitting near-real-time ingestion and querying of time-series data.

The ingested time-series data 191 may represent a large number (high cardinality) of individual time series. An individual time series may include a sequence of values or observations (e.g., for a feature of a system or a phenomenon) that can be plotted over time. An individual time series may be uniquely identified by a set of dimensions (with dimension values) such as what the observations are measuring, where the observations were measured, client-specified tags such as device model or instance type, and so on. For example, a smart-home device may produce a time series representing measurements of humidity in a particular room at a particular address. The same device may also produce other time series representing measurements at the same location for temperature, dust levels, carbon dioxide, and so on. As another example, a virtual compute instance in a multi-tenant provider network may emit a time series representing CPU utilization over time, another time series representing disk reads over time, yet another time series representing network packets received over time, and so on. Because developers often operate on related time series together, time series that are related (e.g., by physical proximity, by being generated by the same device, and so on) may be clustered using the database 100 for efficient storage and retrieval. To enable such applications, the database 100 may offer a query language that provides filtering according to dimensions such as the device model, instance type, region, address, location, and so on, as well as the measure name. In one embodiment, any change to such a dimension may produce a new time series in the database 100.

The database 100 may manage a large amount of time-series data throughout the lifecycle of the data. The times-series data 191 may be received at the database 100 using a fleet of hosts referred to as ingestion routers 110. The time-series data may typically arrive at the database 100 in time order, but the database may be able to ingest out-of-order data as well. The ingestion routers 110 may divide the data 191 from the clients 190 into non-overlapping ingestion partitions. In one embodiment, the ingested data may be spatially partitioned along non-overlapping spatial boundaries according to the time series or range of the data, one or more tags associated with the data, the region that produced the data, the category to which the data belongs, and/or other suitable metadata. Ingested time-series data may be mapped to different partitions based on hierarchical clustering in order to achieve better performance of data storage and retrieval. A partition may include one time series or multiple time series.

A particular time series may be defined by a schema that includes components such as one or more dimension names (e.g., "Region") having one or more dimension values (e.g., "US-West") and a measure name (e.g., "temperature"). As ingested by the time-series database 100, an element of time-series data may include all the schema components (including dimension values) as well as a measure value that represents a particular data point in the time series. The time-series database 100 may be referred to as "schema-less" in that a customer need not formally specify the schema using a control plane 180 or other channel separate from the ingested data 191. Thus clients 190 may begin providing the data 191 to the database 100 more quickly and without performing additional control-plane operations or other configuration tasks.

The ingestion routers 110 may use a clustering scheme 112 to divide the ingested data 191 into various partitions. The clustering scheme 112 may co-locate related time series for optimization of queries and other tasks. The clustering scheme 112 may represent a multi-level hashing scheme in which a hash value for a time series is generated by concatenating hash values for different components of the schema (and dimension values) for the time series. The clustering scheme 112 may be based (at least in part) on schemas and dimension values for individual time series that are derived from ingested data 191 and not necessarily formally specified by customers. For example, to generate a hash representing an individual time series, a clustering scheme 112 for a particular table may first hash the measure name for the various time series, then concatenate a hash for the dimension names, then concatenate a hash for the dimension values. By representing the measure name as a prefix in the hash for an individual time series, various time series that have the same measure name may be clustered together in the partitions and throughout their remaining lifecycle in the database 100. As another example, another clustering scheme 112 may first hash the dimension names, then concatenate a hash for the dimension values, then concatenate a hash for the measure name. As yet another example, another clustering scheme 112 may interleave the dimension names and dimension values (e.g., a hash of a first dimension name, a hash of a first dimension value, a hash of a second dimension name, a hash of a second dimension value, and so on) and then concatenate a hash for the measure name. In one embodiment, the clustering scheme 112 may represent a default scheme that is intended to optimize query performance for a large number (e.g., a majority) of queries for a given table. In one embodiment, the clustering scheme 112 may be selected by a customer, e.g., on a table-by-table basis.

In addition to the ingestion routers 110, the database 100 may include hosts such as storage nodes 140 and query processors that implement a query engine 170. A fleet of storage nodes 140 may take the partitioned time-series data from the ingestion routers 110, potentially process the data in various ways, and add the data to one or more storage tiers 150A-150N. For example, the storage nodes 140 may write data from one partition to a "hot" storage tier 150A at a lower latency and to a "cold" storage tier 150N at a higher latency. In various embodiments, storage nodes may perform reordering, deduplication, aggregation of different time periods, rollups, and other transformations on time series data. Storage nodes 140 may perform tasks such as creating materialized views or derived tables based on a partition, such as an aggregation or rollup of a time interval. The tasks may include continuous queries that are performed repeatedly over time, e.g., to create aggregations for each hour or day of a time series as that time period is finalized. By co-locating related time-series using the clustering scheme 112, tasks such as aggregations and cross-series rollups may be optimized or otherwise have their performance improved.

The data 191 may be routed from the routers 110 to the storage nodes 140 according to routing metadata, e.g., that maps different time series or ranges of the data to different storage nodes. In one embodiment, the routing metadata may represent the assignment of tile leases to particular storage nodes. In one embodiment, a given storage node may be assigned to one and only one partition at a time. In one embodiment, the storage nodes 140 may organize the time series in tables. The storage nodes 140 may also be referred to as writers or table builders. A table may store multiple time series. A table may be a named entity that stores related time series that are usable by the same application and often managed by the same customer of the database 100. A data point (e.g., an element) in a time series may be stored in a record. Data points or elements of time-series data may be added to the database 100 using application programming interface (API) calls or other programmatic interfaces. In one embodiment, data points for multiple time series (e.g., for related time series generated by the same client device) with the same timestamp may be added by a client using a single API call. A data point may be associated with a timestamp, one or more dimensions (in name-value pairs) representing characteristics of the time series, and a measure representing a variable whose value is tracked over time. Timestamps may be provided by clients or automatically added upon ingestion. Measures may be identified by names and may often have numeric values. Measures may be used by the database 100 in generating aggregations such as min, max, average, and count. For example, a time series related to automobiles may be identified by a unique combination of values for dimensions of a vehicle identification number (VIN), country, state, and city, while measures for such a time series may include the battery state and the miles traveled per day. In one embodiment, queries may specify time intervals and/or dimension names and/or dimension values instead of or in addition to individual measures.

The time-series database 100 may include a metadata service 120 that maintains a metadata index 122. The metadata service 120 may represent a centralized component that authoritatively, consistently, and durably stores the locations and metadata of time-series data. To maintain high availability and high throughput for ingestion of time-series data, the time-series database 100 may use the metadata service 120 to identify the locations to which incoming time-series data points within particular time and space ranges are routed. To maintain high availability and high throughput for queries of time-series data, the time-series database 100 may use the metadata service 120 to identify the locations to which queries for particular time and space ranges are routed. The metadata index 122 may be highly scalable and highly available. In some embodiments, the metadata index 122 may support fast lookups (e.g., millisecond lookups) for billions of two-dimensional tiles and trillions of ingested data points per day. The metadata index 122 may be built on a data store 130 (e.g., a NoSQL data store) that provides scalability and durability. The metadata service 120 may leverage a cache 125 for performance and scalability. The metadata service 120 may distribute workload heat evenly across the caching fleet to prevent "hot spots."

The metadata service 120 may index metadata 132 associated with individual customer tables, e.g., the table name to table ID resolution, the ingestion/retention period, and other database/table metadata. Customer table metadata 132 may be updated in the underlying data store 130 by the ingestion router(s). Table metadata 132 updates may be triggered by operations such as table creation, table updating, table deletion, and so on. Table metadata updates in the underlying data store 130 may be propagated to the cache 125 on a best-effort basis. The metadata service 120 may index metadata 134 associated with individual tiles, e.g., the location of customer data partitions across the database clusters 160A and other storage locations 160N, as indexed across time and space. Tile or partition metadata 134 updates such as tile creation, splits, merges, and deletions may be stored by the storage nodes in a tile metadata table in the data store 130. Tile metadata 134 updates in the underlying data store 130 may be propagated to the cache 125 on a best-effort basis. The metadata service 120 may index table schemas 136, e.g., dimension names and measure names. Table schema 136 updates may be stored by the storage nodes in the data store 130 and may be propagated to the cache on a best-effort basis. Table schemas 36 may be versioned, e.g., such that any addition of one or more dimension names to a schema results in a higher version number. Using versioning of table schemas 136, schema changes may be detected at runtime, e.g., when queries are performed. The metadata service 120 may cache metadata entries by request, and a cache miss may result in a call to the data store 130 and population of the cache 125 on a best-effort basis.

The various storage tiers 150A-150N may represent different use cases for time-series data. The storage tiers 150A-150N may differ in their storage formats, access interfaces, performance characteristics, durability characteristics, and cost characteristics. For example, the database 100 may include a hot tier (such as tier 150A) that offers the lowest latency by storing recent time-series data in volatile memory resources (e.g., random access memory) across a distributed set of storages nodes. The hot tier 150A may also be referred to as a memory store. As another example, the database 100 may include a cold tier (such as tier 150N) that offers higher latency (but a lower cost) by storing a longer interval of time-series data using persistent storage resources such as disk drives. The cold tier 150N may also be referred to as a magnetic store. The database 100 may include other tiers such as a warm tier that stores recent time-series data in nonvolatile storage resources (e.g., solid-state drives) across a distributed set of storages nodes, a frozen tier that stores even older time-series data in sequential access storage media, and so on. Based on their needs and budgets, users of the time-series database 100 may select and configure one or more of the storage tiers 150A-150N for storage of their time-series data.

In one embodiment, the database 100 may represent a container of tables and policies, such as retention policies. Policies may be applied at the database level for all tables or may be overridden for individual tables. The database 100 may offer a control plane 180 that permits customers (e.g., developers of applications) and other systems to perform management and modeling of time series data. For example, a component for time-series data management of the control plane 180 may offer APIs for creating, deleting, and listing tables (or entire databases); describing tables and policies; creating and updating policies and associating policies with tables; listing series within a table; and so on. A retention policy may determine the time interval for which an element of time-series data is kept in a particular tier; beyond that time interval, the time-series data may expire and may be deleted from the tier. Different tiers may differ in their retention policies for time-series data. Tables may also differ in their retention policies. In one embodiment, for example, the database 100 may have default retention periods of three hours for the hot tier and one year for the cold tier. In one embodiment, costs may be assessed to clients for the use of the database 100 to store their time-series data, and the per-measure costs assessed for the hot tier may be greater than the per-measure costs for the cold tier. Accordingly, customers may adjust the retention policies to reach a balance between performance (e.g., query latency) and cost.

The time-series data may be deemed immutable once written to a particular storage tier, e.g., such that new values may be appended to a time series but existing values may not be deleted (except for expiration based on a retention policy). Using a fleet of query processors and/or other components of a query engine 170, queries of time-series data may be performed for query predicates, e.g., particular time intervals and particular time series. Queries may be expressed as statements in a query language. In some embodiments, the query language may comprise at least a subset of American National Standards Institute (ANSI) Structured Query Language (SQL). The query language may represent time series as a first-class concept. The query language may comprise a data type for time series such that query statements may refer to particular time series using the time-series data type. The time-series data type may represent a measure over time (where time is of type timestamp) as an array of tuples with one attribute being a timestamp and another being a measure value, where the values are sorted in ascending order of time. In some embodiments, the query engine 170 may support queries on both a flat relational data model (e.g., a data points view) and a nested data model (e.g., a time-series view) involving time series data types.

The query engine 170 may support a variety of query categories or types. In some embodiments, the query engine 170 may perform alerting queries which touch small amounts of data (e.g., megabytes) and perform simple computations (such as aggregations). Alerting queries may typically access data in the memory store and may have stringent latency requirements, and users may often submit tens to hundreds of such concurrent queries. In some embodiments, the query engine 170 may perform dashboarding queries which perform more involved analysis and aggregation. Dashboarding queries may be fewer in volume compared to alerting queries and may have more relaxed latency characteristics. In some embodiments, the query engine 170 may perform historical analysis and forecasting queries which are even fewer in volume, though each such query may be expected to analyze large volumes of historical data spread across several storage tiers.

The query engine 170 may perform tasks such as one-time queries of time-series data in one or more storage tiers 150A-150N, transformations of time-series data, and other computations. The query engine and the query language may support analytical functions on time-series data, e.g., functions that perform transformations of underlying time-series data. Responses to such queries may include aggregations or other transformations of time-series data read from one or more storage tiers. For example, the query engine and the query language may enable functions such as joins, group-by functions, transformations, aggregations, scalar functions, and so on to be performed on time-series data. As another example, the query engine and the query language may enable specialized mathematical functions such as interpolation, derivatives, Fourier transforms, approximation, and smoothing to be performed on time-series data, e.g., in order to find trends and patterns. By contrast, traditional relational database management systems may require developers to write complex application code in order to perform such functions. By interacting with the query engine 170, various applications may use the database 100 to perform analysis of time-series data. For example, machine learning and machine vision applications may use time-series data managed by the database 100.

The time-series database 100 may elastically scale the resources allocated to a specific customer, e.g., using a distributed control plane that manages a "warm" (or pre-configured) pool of resources. Such resources may be allocated to execute queries that scale independently of the resources allocated for ingestion and storage of time-series data. The query resources may scale based (at least in part) on the query volume and amount of data analyzed by the queries.

The query processors and/or other components of a query engine 170 may implement adaptive querying 175 over tiered storage. Using the adaptive querying 175, the time-series database 100 may execute customer queries of time-series data across the plurality of storage tiers. As discussed herein, elements of time-series data may be migrated automatically from one storage tier to another storage tier by the time-series database, e.g., from the hot tier to the cold tier over time based (at least in part) on a retention policy for a customer table. However, a customer query may be written on a logical view of time-series data that is independent of the underlying storage in the various storage tiers. The database 100 may enable customers to write queries without knowledge of the specific storage locations and storage technologies in which their time-series data is stored. In some circumstances, a particular query may ask for time-series data that happens to be stored in two or more storage tiers (e.g., following migration of some of the data from the hot tier to the cold tier).

To perform adaptive querying 175, based (at least in part) on the table(s) referenced in a query and the predicate(s) in the query, the query engine may consult with the metadata service 120 to identify which partitions are relevant to answer the query. During query planning, the query engine may interact with the metadata service 120 to prune out irrelevant partitions and process the partitions relevant to the query. The query engine may determine which storage tier(s) host the partitions relevant to the query. The query engine may adaptively determine how to read the underlying data from different storage tiers according to the different storage formats, storage technologies, and/or access characteristics (e.g., APIs or access interfaces through which read requests are submitted and results are returned) of the storage tiers. By converting data from various source formats of the storage tiers to a common target format, the query engine may merge the results from the one or more storage tiers into the appropriate internal view to create a unified logical representation of the time-series data that is relevant to the query. By automatically translating between the logical representation of time-series data and the underlying physical storage of that data, the query engine may allow customers to write queries in a consistent manner, regardless of the differences between storage tiers in which their data is stored.

In some embodiments, the adaptive querying 175 may be performed using one plug-in in a query engine, where the plug-in permits querying of time-series data from different storage tiers having different storage formats and/or access characteristics. The storage tier 150A may be accessed using a different API or other access interface than the storage tier 150N, and the database 100 may execute queries that read data from the different storage formats without users having knowledge of the differences between the access interfaces of the storage tiers. Storage tiers may vary in storage format, and the database 100 may execute queries that read data from the different storage formats without users having knowledge of the differences between storage tiers. For example, the storage tier 150A may store time-series data in two-dimensional tiles 162 using storage resources 160A including MySQL database clusters. Using the metadata index 122, the query engine 170 may determine which of these tiles contains time-series data requested by a query (e.g., data within the spatial and temporal boundaries of one or more time series as defined by the query predicates). The query engine may then go to the tiles and read the data according to the particular storage format and the access interface of the storage tier 150A. The storage tier 150A may include two different tables: a time-series definition table and a time-series data points table. The definition table may indicate which time series are present in a particular tile. The data points table may indicate the data points, e.g., the measure, timestamp, and measure value tuples. In reading the requested time-series data to execute a customer query involving the storage tier 150A, the adaptive querying 175 may query both tables and join the results of the two queries. Data in the data points table may be tagged with a time series identifier that enables the join operation.

The storage tier 150N may store time-series data in a different format than that of the storage tier 150A. For example, the storage tier 150N may store time-series data in files using storage resources 160N, e.g., such that a cloud-based storage service maintains the files. Using the metadata index 122, the query engine 170 may determine which of these files contains time-series data requested by a query (e.g., data within the spatial and temporal boundaries of one or more time series as defined by the query predicates). The query engine may then go to the files and read the data according to the particular storage format and the access interface of the storage tier 150N. The files may be stored in a structured format, such as the Parquet file format, that provides efficient as well as performant flat columnar storage of data. The files themselves may include indices or other metadata (e.g., file footers) that indicate what data is contained in the files. Using this metadata in combination with the query predicates, the adaptive querying 175 may identify and read only one or more relevant chunks from a file and not read other (irrelevant) chunks from the file. The use of such chunk queries may optimize the use of network resources, memory resources, and so on.

The adaptive querying 175 may identify relevant partitions and other storage locations based (at least in part) on the table schema stored using the metadata index 122. For example, the metadata index 122 may comprise a root node representing spatial and temporal boundaries of the table and a plurality of leaf nodes representing the spatial and temporal boundaries of the requested time-series data. To build a query plan, one or more paths through the metadata index may be selected based (at least in part) on the spatial and temporal boundaries of the requested time-series data. One or more of the leaf nodes may indicate the one or more storage locations the requested time-series data in the storage resources. The adaptive querying 175 may transform query results from each storage tier from a source format associated with that tier into a unified target format. The adaptive querying 175 may generate the overall query result based (at least in part) on the table schema stored using the metadata index 122, e.g., such that the query results may present data read from different storage tiers in a unified logical representation based (at least in part) on the schema. The query result may include time-series data from one or more storage tiers having partitions relevant to the query predicates.

In some embodiments, the query engine 170 may return a large result set over multiple API calls and responses in a paginated fashion. Each result page may include a subset of the result and a token describing the next result page to be fetched. In some embodiments, the query engine 170 may support synchronous queries via an API where the call to execute the query blocks until the first page of the result is returned to the client. In some embodiments, the query engine 170 may support asynchronous queries where the call to execute a query enqueues the query and returns the caller a unique ID which can then be used to obtain the status of the query, fetch the results, or cancel it.

In some embodiments, the database 100 and the query language may represent time at the nanosecond resolution. For example, both ingestion and queries of time-series data may operate at the nanosecond level. In some embodiments, the database 100 may store time values as 64-bit values, e.g., as Unix epoch time values. On ingestion and/or storage of time-series data, the database 100 may use these 64-bit representations as nanosecond resolution timestamps rather than millisecond resolution timestamps. The query engine may then interpret these 64-bit representations as nanosecond resolution timestamps rather than millisecond resolution timestamps.

Using the clustering scheme 112, various time series that are similar (e.g., that have the same measure name) may be clustered together in the storage tier(s) 150A-150N. Queries for time-series data having the same measure name (or other hash prefix in the selected clustering scheme) may then be performed more efficiently. The same clustering scheme 112 may be used throughout the database 100 to optimize both storage and retrieval of time-series data. For example, the query engine 170 may use the same clustering (hashing) scheme 112 to identify the partition(s) associated with the hash of the measure name (or other prefix of the partition hash) and implement the query only using the identified partition(s) in the relevant storage tier(s).

In one embodiment, one or more components of the distributed database 100, such as hosts 110, 140 and 170, the metadata service 120, other compute instances, and/or storage resources, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, storage nodes 140, storage resources 160A-160N, and/or query engine 170. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as the distributed database 100, may be offered to clients in exchange for fees.

In one or more of the storage tiers such as tier 150A, the time-series data may be partitioned into a set of tiles 162 along non-overlapping temporal and spatial boundaries. A tile may thus represent a partition of time-series data within a time range (between a starting time and an ending time) and within a range of keys. The storage resources 160A for such a tier 150A may also include a set of storage nodes that are distributed across various data centers, availability zones, or other logical or geographical locations. A tile may be replicated across the storage nodes with a group of replicas (e.g., three replicas) that are eventually consistent without using a server-side consensus mechanism. The storage tier 150A may use a plurality of database clusters to store time-series data, e.g., using two-dimensional tiles 162.

In some embodiments, a lease to a given tile may be assigned to one and only one of the storage nodes 140 at a given time. A tile lease may permit a particular storage node to write time-series data to that tile, to the exclusion of other storage nodes. A tile lease may last indefinitely, e.g., until the tile expires (and is removed from the storage tier 150A) or another storage node acquires the lease. Time-series data in a tile may be removed from one storage tier 150A and moved to another storage tier according to a retention policy based (at least in part) on the age of the data. The storage resources 160A (e.g., database clusters) of the storage tier 150A may store tile lease metadata describing aspects of tile leases. The storage resources 160A (e.g., database clusters) of the storage tier 150A may use the lease metadata to approve or deny requests from particular storage nodes to write time-series data to particular tiles. For example, the lease metadata may indicate lease identifiers, storage node identifiers, and/or other information usable to approve or deny requests to write time-series data to particular tiles. As discussed herein, tile leases may be assigned to storage nodes using inline data path operations and not necessarily requiring use of the control plane 180. Tile leases may be assigned initially on a random (or pseudo-random) basis, and a refinement mechanism may be used for heat balancing among storage nodes. Aspects of the lease metadata (e.g., the assignment of particular leases to particular storage nodes) may be stored using a centralized lease metadata cache 120 to facilitate the propagation of updates among the ingestion routers 110, storage nodes 140, and database clusters 160A.

Figure 13:
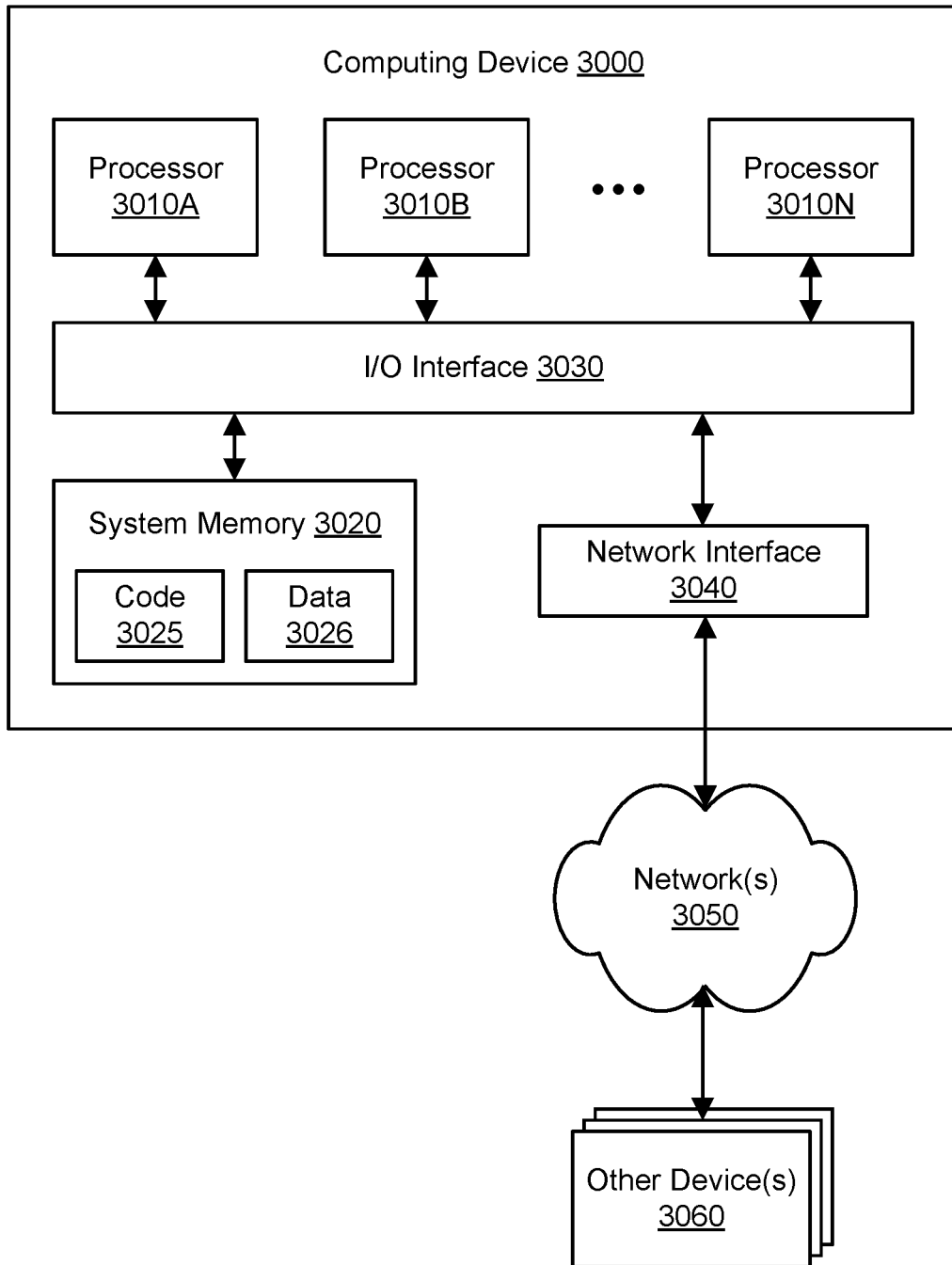
FIG. 13 illustrates an example computing device that may be used in some embodiments.

In various embodiments, components of the distributed database 100, such as the ingestion routers 110, streaming service 120, storage nodes 140, storage resources 160A-160N, query engine 170, and/or metadata service 120 may be implemented using any suitable number and configuration of computing devices, any of which may be implemented by the example computing device 3000 illustrated in FIG. 13. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. Client devices 190 may be managed or owned by one or more customers of the database 100. For example, a particular customer may be a business that sells sensor devices for installation in residences and businesses, and those sensor devices may represent the client devices 190. In one embodiment, the client devices may be implemented using any suitable number and configuration of computing devices, any of which may be implemented by the example computing device 3000 illustrated in FIG. 13. Clients 190 may convey network-based service requests to the ingestion router fleet 110 via one or more networks, e.g., to supply a stream of data for processing using the storage nodes 140 and storage in the storage tiers 150A-150N. The network(s) may encompass any suitable combination of networking hardware and protocols necessary to establish network-based communications between client devices 190 and the distributed database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
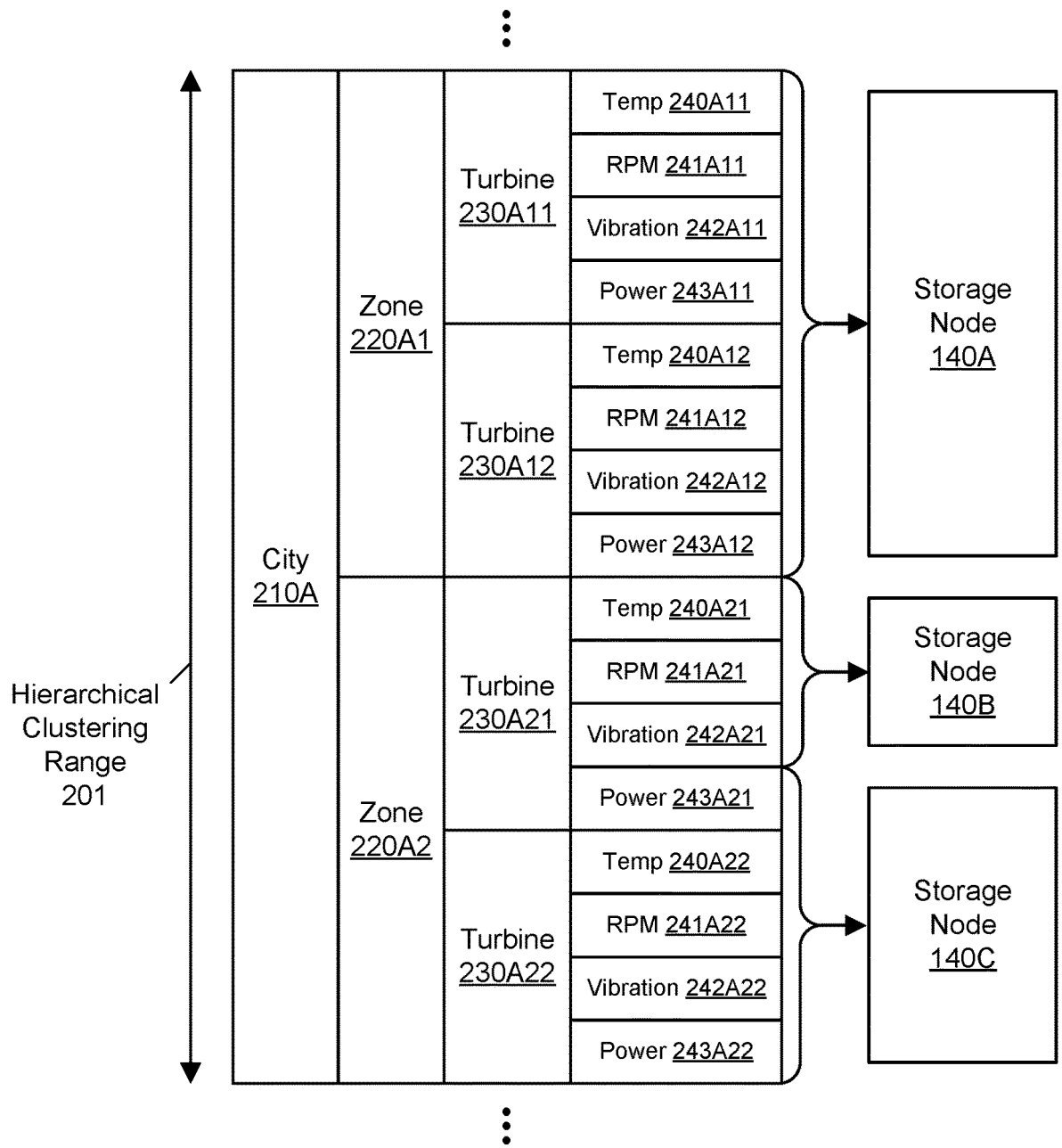
FIG. 2 illustrates an example of hierarchical clustering of ingested time-series data in a time-series database with adaptive querying over tiered storage, according to some embodiments.

FIG. 2 illustrates an example of hierarchical clustering of ingested time-series data in adaptive querying of time-series data over tiered storage, according to some embodiments. The ingestion routers 110 may organize time-series data along a hierarchical clustering range 201. Some time series may be related to other time series via a hierarchy. Using hierarchical clustering, related time series may be placed near each other throughout their lifecycle in the time-series database 100. The use of hierarchical clustering may achieve a higher degree of compression for time-series data as well as lower latency for queries. The hierarchy may be specified by clients 190 or may be inferred automatically using contextual information, such as the geographical proximity of different time series, the generation of different time series by the same client device, and so on. The ingestion routers 110 may tag incoming data points so that hierarchically related series are co-located properly. A hash-based clustering scheme may be used at various stages of the database 100 to enforce the hierarchical clustering. The hash-based clustering scheme may have multiple levels. The hierarchical clustering may reduce the time required to perform a query using adaptive query processing 175.

As shown in the example of FIG. 2, an example of a hierarchical relationship path for client devices representing wind-turbine sensors may be Country, State, City, Zone, Wind Turbine, and Metric. A portion of data having this hierarchical scheme may include data for a particular city 210A, two zones 220A1 and 220A2, and two turbines per zone 230A11, 230A12, 230A21, and 230A22. Turbine 230A11 may include measurements for temperature 240A11, RPM 241A11, vibration 242A11, and power 243A11. Turbine 230A12 may include measurements for temperature 240A12, RPM 241A12, vibration 242A12, and power 243A12. Turbine 230A21 may include measurements for temperature 240A21, RPM 241A21, vibration 242A21, and power 243A21. Turbine 230A22 may include measurements for temperature 240A22, RPM 241A22, vibration 242A22, and power 243A22. A hash-based clustering scheme supporting this hierarchy may co-locate all measurements for a given wind turbine, all wind turbines for a given zone, and so on. In one embodiment, all metrics of all wind turbines in a zone/city/state may be clustered together. In one embodiment, the hierarchical clustering may be changed over time and in response to query workloads in order to reduce the latency of queries. For example, the example data of FIG. 2 may be reorganized (for future data points) with temp, RPM, vibration, and power as higher-level constructs than the turbine identifiers.

The data points for the hierarchy shown in FIG. 2 may be mapped to various durable partitions by the ingestion routers 110. As shown in the example, the time-series data may be mapped and routed to storage nodes 140A, 140B, and 140C. In one embodiment, different numbers of time series may be mapped to different partitions based (at least in part) on the ingestion rate of those time series. Partitions may be split or merged as appropriate to adapt to changing ingestion rates for various time series. A particular partition may be routed to a particular storage node, e.g., for writing data from the partition to a particular storage tier. As shown in the example of FIG. 2, a first partition may be routed to storage node 140A, another partition may be routed to storage node 140B, and yet another partition may be routed to storage node 140C.

Figure 3:
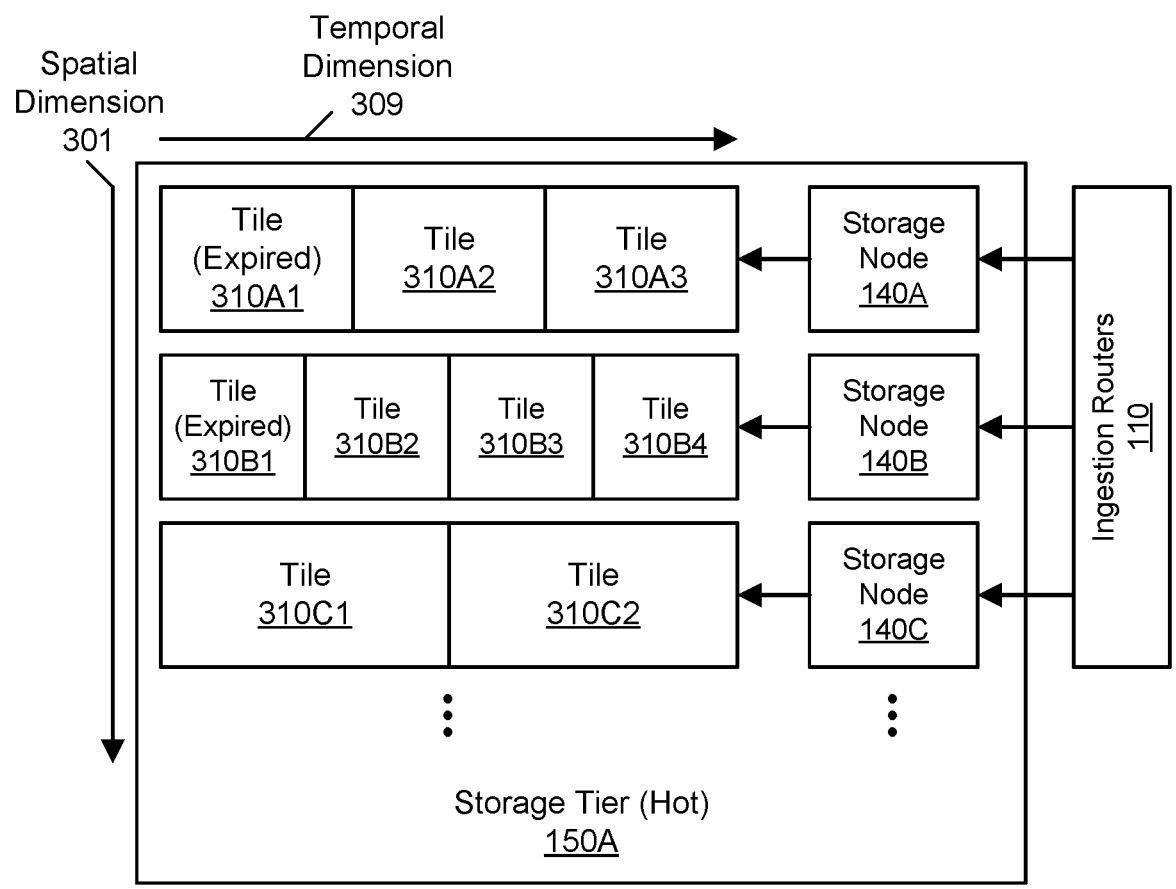
FIG. 3 illustrates an example of storage of time-series data using two-dimensional tiles in a hot tier in a time-series database with adaptive querying over tiered storage, according to some embodiments.

FIG. 3 illustrates an example of storage of time-series data using two-dimensional tiles in a hot tier in adaptive querying of time-series data over tiered storage, according to some embodiments. As discussed above, the database 100 may include a hot storage tier such as tier 150A that stores recent data with high availability and low latency. In one embodiment, the hot tier 150A may include a set of storage resources 160A such as database clusters that include computational resources and memory resources. The database clusters may store time-series data using tiles that are generated or appended to by storage nodes 140. Tiles may be stored using storage resources such as memory (e.g., RAM) and/or solid-state drives for lower latency of storage and retrieval. Tiles may be replicated across different storage resources of clusters (e.g., in different data centers or availability zones) for improved durability. Tiles may be partitioned along non-overlapping spatial boundaries, e.g., such that time-series data from one time series is assigned to one tile while time-series data from another time series is assigned to another tile. However, a tile may hold one or more time series. The spatial range may be based on schema-based clustering that seeks to co-locate related time series in the same partition, and the schema-based clustering may be performed by the ingestion routers 110. Tiles may also be partitioned along non-overlapping temporal boundaries. Due to the spatial dimension 301 and the temporal dimension 309, tiles may be said to be two-dimensional. The two-dimensional partitioning represented in tiles may be decoupled from the partitioning of the ingestion stage due to the difference in write latency between the stages. The same partitioning scheme may be used, but the partition ranges may differ. In one embodiment, if the clustering scheme is changed, then subsequent tiles may be reorganized to reflect the clustering change over time.

In the example of FIG. 3, a set of time series may be routed to storage nodes 140A, 140B, and 140C based on a spatial range (e.g., using schema-based clustering). Particular partitions of time-series data may be mapped to particular storage nodes for writing data from the partitions to the hot tier 150A. For example, one partition may be assigned to storage node 140A that writes to the hot tier, another partition may be assigned to storage node 140B that writes to the hot tier, and yet another partition may be assigned to storage node 140C that writes to the hot tier. For a given time series or partition, tiles representing older windows of time may be termed "closed," while a tile representing a current window of time may be termed "open." Tiles may be closed when the amount of data reached a threshold or when a maximum time interval is reached. For current data points (e.g., data not received out of order), the storage node for a partition may write to an open tile. Out-of-order data may be routed to previously closed tiles in some circumstances. Tiles whose temporal boundaries are beyond the retention period (e.g., three hours) for the tier and table may be deemed expired and either deleted or marked for deletion. As shown in the example of FIG. 3, storage node 140A may write to an open tile 310A3 that was preceded in time by a tile 310A2 that was preceded in time by a now-expired tile 310A. Similarly, storage node 140B may write to an open tile 310B4 that was preceded in time by a tile 310B3 that was preceded in time by a tile 310B2 that was preceded in time by a now-expired tile 310B1. Additionally, storage node 140C may write to an open tile 310C2 that was preceded in time by a tile 310C1. As discussed above, the contents of a tile may be replicated (e.g., using three replicas) across different location or zones to achieve greater durability within the hot tier.

Figure 4:
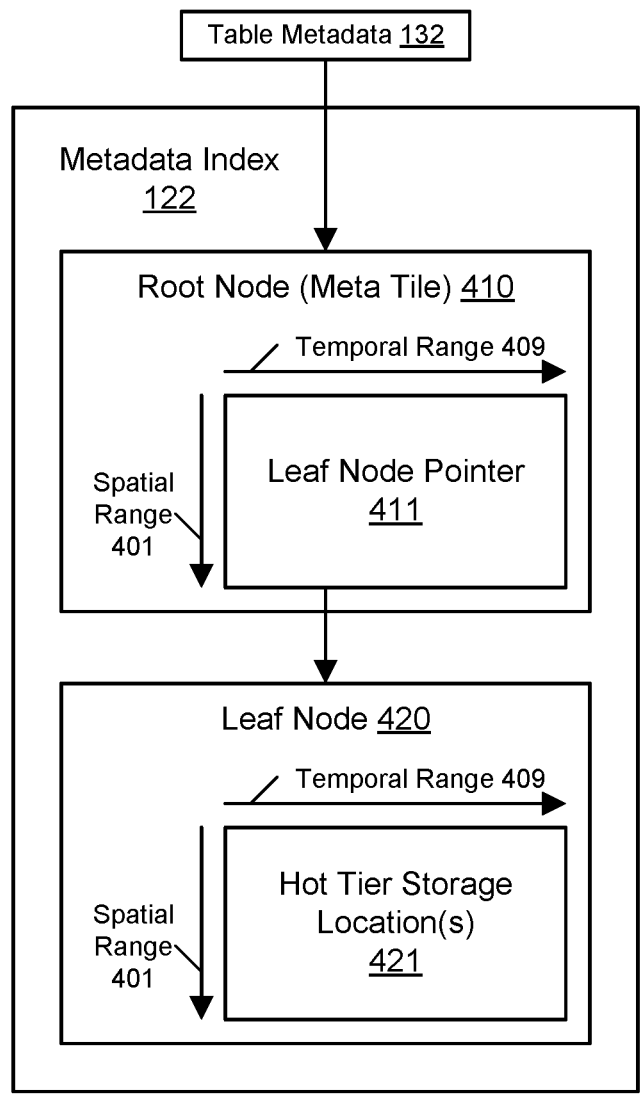
FIG. 4 illustrates an example of a scalable metadata index for a time-series database including a root node (meta tile) and a leaf node, according to some embodiments.

FIG. 4 illustrates an example of a scalable metadata index for a time-series database including a root node (meta tile) and a leaf node, according to some embodiments. The metadata index 122 may be implemented using a directed acyclic graph (DAG) or other tree-like data structure. In some embodiments, the metadata index 122 may use a two-dimensional B+ tree variant for storing time-series metadata. The graph may include nodes that are associated with particular spatial and temporal ranges of time-series data. The graph may include a root index node representing a high-level meta tile for a particular customer table. For example, the index 122 may include the root node 410 representing such a meta tile. The meta tile may represent the entire spatial range 401 and temporal range 409 of a particular table. The temporal range 409 may begin at a specific date and time and may extend to infinity or to a date and time in the far future. Customer table metadata 132 may include a pointer to the root node 410 for a given table. The graph may optionally include one or more intermediate index nodes that descend from the root node 410 or from other index nodes, each representing particular a portion of the spatial and temporal range of any parent index nodes such as the high-level meta tile 410. Below the index node(s), the graph may include a layer of leaf nodes that include pointers to location data for particular tiles in the underlying data store, where each leaf node represents a spatial and temporal range within the broader spatial and temporal range of a parent index node. For example, the index 122 may include a leaf node 420. The example shown in FIG. 4 may represent the state of an index 122 on creation of the table, where the table includes only one two-dimensional tile representing the entire spatial range 401 and temporal range 409 of the corresponding table.

In some embodiments, nodes may not include pointers to parent nodes, and the graph may be traversed in only one direction, e.g., starting with the root node 410. In some embodiments, a node (e.g., an index node or leaf node) may include a unique identifier usable to store the node in the data store 130, e.g., as a single row keyed by the unique identifier. In some embodiments, a node (e.g., an index node or leaf node) may include a bounding box for a spatial and temporal range represented by the sub-tree underneath the node. A bounding box may represent a rectangular representation of a set of spatial and temporal boundaries. An index node (representing a meta tile) may include one or more pointers to one or more other meta tiles or one or more leaf nodes. For example, root index node 410 may include a leaf node pointer 411 to the leaf node 420. An index node (representing a meta tile) may include one or more pairs of identifiers and bounding boxes of its child nodes.

A leaf node may include information about data sources at which time-series data is stored in one or more storage tiers 150A-150N. The data sources may include one or more database clusters in a "hot" storage tier 150A and/or one or more "buckets" of storage provided by a cloud-based storage service in a "cold" storage tier 150N. For example, the leaf node 420 may include information 421 indicating one or more storage locations in the hot tier 150A. In some embodiments, the actual storage location(s) may be stored in the data store 130, and the hot tier information 421 in the leaf node 420 may represent one or more references (e.g., one or more keys) to the storage location(s) as stored in the data store.

Figure 5A:
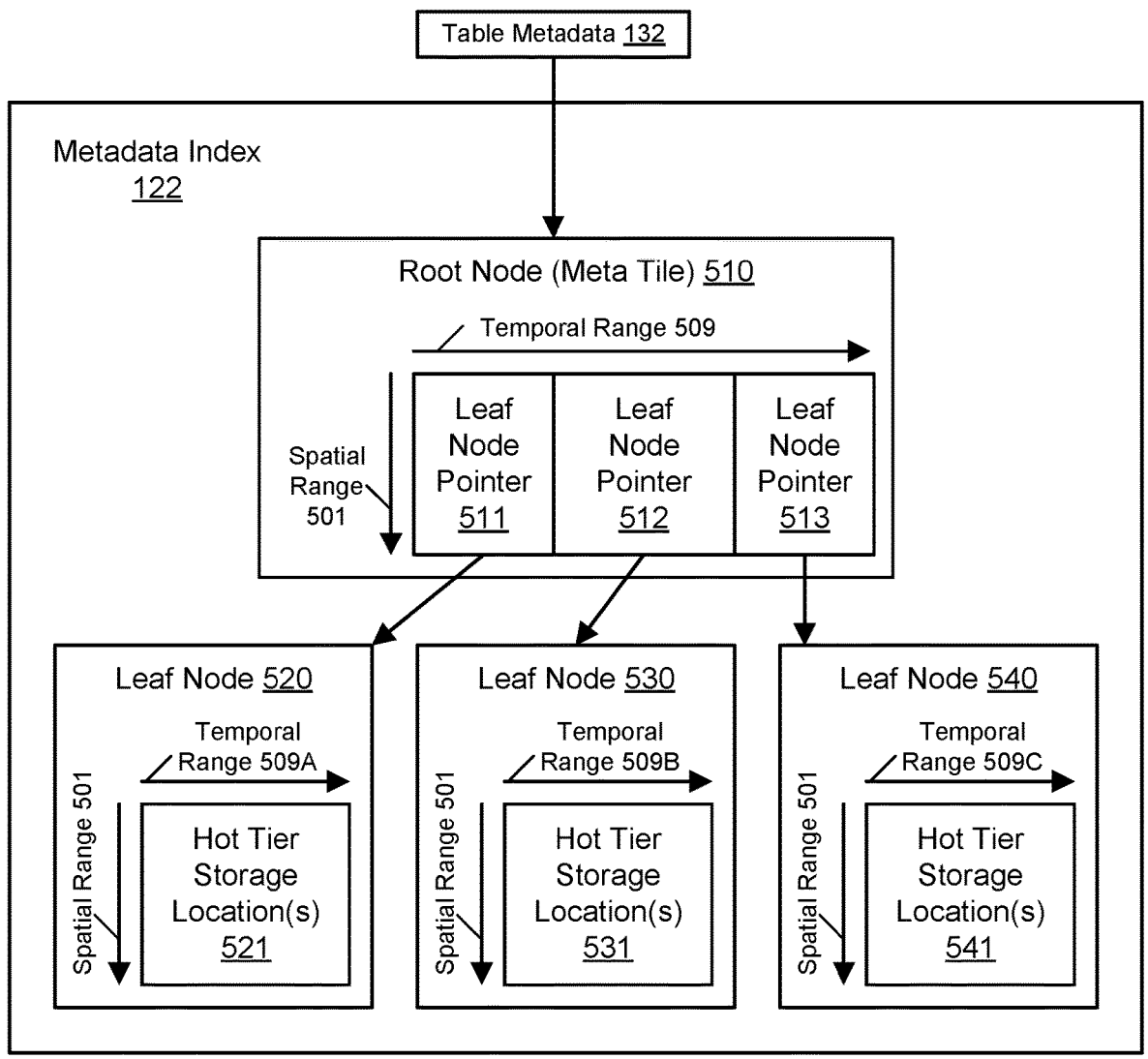
FIG. 5A illustrates an example of a metadata index resulting from one or more partition splits, according to some embodiments.

FIG. 5A illustrates an example of a metadata index resulting from one or more partition splits, according to some embodiments. When two-dimensional tiles in the time-series database 100 are repartitioned (e.g., split or merged), the index 122 may allow low-latency atomic updates. Splits may be initiated by storage nodes 140, and the metadata index 122 as well as the metadata in the data store 130 may be modified to reflect the changes. As shown in the example of FIG. 5A, the table represented by a root node 510 may have been subjected to one or more partition splits in the temporal dimension 509 but not necessarily in the spatial dimension 501. For example, an initial tile may have been split into two tiles representing different portions of the temporal range, and one of the new tiles may again have been split into two tiles representing different portions of the temporal range. Leaf nodes in the index 122 may represent individual tiles or other partitions in the database 100. As shown in the example of FIG. 5A, the root node 510 may now include a leaf node pointer 511 to a first leaf node 520, a leaf node pointer 512 to a second leaf node 530, and a leaf node pointer 513 to a third leaf node 520. The first leaf node 520 may represent the spatial range 501 and a first portion 509A of the temporal range 509, the second leaf node 530 may represent the spatial range 501 and a second portion 509B of the temporal range 509, and the third leaf node 540 may represent the spatial range 501 and a third portion 509C of the temporal range 509. The first leaf node 520 may include information 521 indicating or referencing one or more storage locations in the hot tier 150A, the second leaf node 530 may include information 531 indicating or referencing one or more storage locations in the hot tier 150A, and the third leaf node 530 may also include information 531 indicating or referencing one or more storage locations in the hot tier 150A.

In some embodiments, tiles resulting from a split may satisfy the same bounding box (spatial and temporal ranges) as the original tile with no gaps. To persist a partition split to the index 122, the meta tile(s) pointing to the tile to be split may be identified. This lookup may be performed using traversal of the index with a bounding box. A single transaction in the data store 130 may be performed to create the new post-split tiles, replace the pointer in the meta tile with pointers to the post-split tiles, and mark the tile-to-be-split for deletion (e.g., using a time-to-live [TTL] functionality of the data store 130). In some embodiments, n-to-m repartitions may be performed such that some combination of splits and merges are carried out in sequence to turn n tiles into m tiles. The various splits and/or merges may be persisted to the metadata index 122 using a single modification rather than a set of individual modifications for each split or merge.

The time-series database 100 may performs splits of tiles such that data movement (e.g., from one database cluster to another) is minimized while high availability for writes and queries is maintained. A storage node 140A may include a component for tile heat analysis. The tile heat analysis may analyze metrics for the heat for individual tiles whose leases are held by the storage node 140A. The heat for a tile may represent the throughput of data written to the tile or some other usage metric or rate. If the heat for a particular tile exceeds a heat threshold (e.g., a particular throughput or other usage over the past N minutes), then the node 140A may decide to split the tile to maintain high availability for writes of newly ingested time-series data. A tile splitting component may implement the tile splitting in a manner that minimizes data movement from database cluster to database cluster. The tile may have temporal boundaries representing a particular temporal range and spatial boundaries representing a particular spatial range. In some embodiments, the temporal range may extend indefinitely into the future. As will be discussed below, the tile splitting may first perform a temporal split and then a spatial split to minimize data movement while maintaining high availability.

The original tile may be split temporally. The temporal split may result in an intermediate tile having the original spatial boundaries but a later portion of the original temporal boundaries. The tile may be considered temporary. No data may be written to the intermediate tile, and in some embodiments, no tile metadata may be created for the intermediate tile. The temporal split may also result in a tile having the original spatial boundaries but an earlier portion of the original temporal boundaries. The tile may represent a modified version of the original tile, e.g., by storing the tile and its contents in the original location but with modified tile metadata. The temporal split point may be selected at a time at or after the current time. The temporal split point may be selected at a time after the latest timestamp of any time-series data already written to the original tile. By generating the intermediate tile with temporal boundaries in the future, the corresponding data set may be empty at the time of the temporal split. The tile may remain in its current location in the database cluster such that none of its contents need to be moved. Additionally, the tile may continue to receive some time-series data, depending on when the temporal split point is selected. In some embodiments, the storage node 140A may acquire leases to the tile, but no lease need be acquired for intermediate tile because it is a temporary element. The tile splitting may include adding indirection pointers from the original tile to newly created tiles and from the newly created tiles to the original tile.

The intermediate tile may then be split spatially to generate two new tiles. The temporal split and spatial split may be performed as a two-stage but atomic operation such that no tile metadata is created for the intermediate and temporary tile. The first new tile may represent a first portion of the original spatial boundaries along with the same temporal boundaries as the intermediate tile. Similarly, the second new tile may represent a second portion of the original spatial boundaries along with the same temporal boundaries as the intermediate tile. The spatial range may be divided among the new tiles on any suitable basis, e.g., to divide the heat as evenly as possible. The spatial range of the first new tile may include a contiguous series of keys, and the spatial range of the second new tile may also include a contiguous series of keys. The respective spatial ranges of the new tiles may be non-overlapping. In some embodiments, the storage node 140A may acquire leases to the new tiles.

Figure 5B:
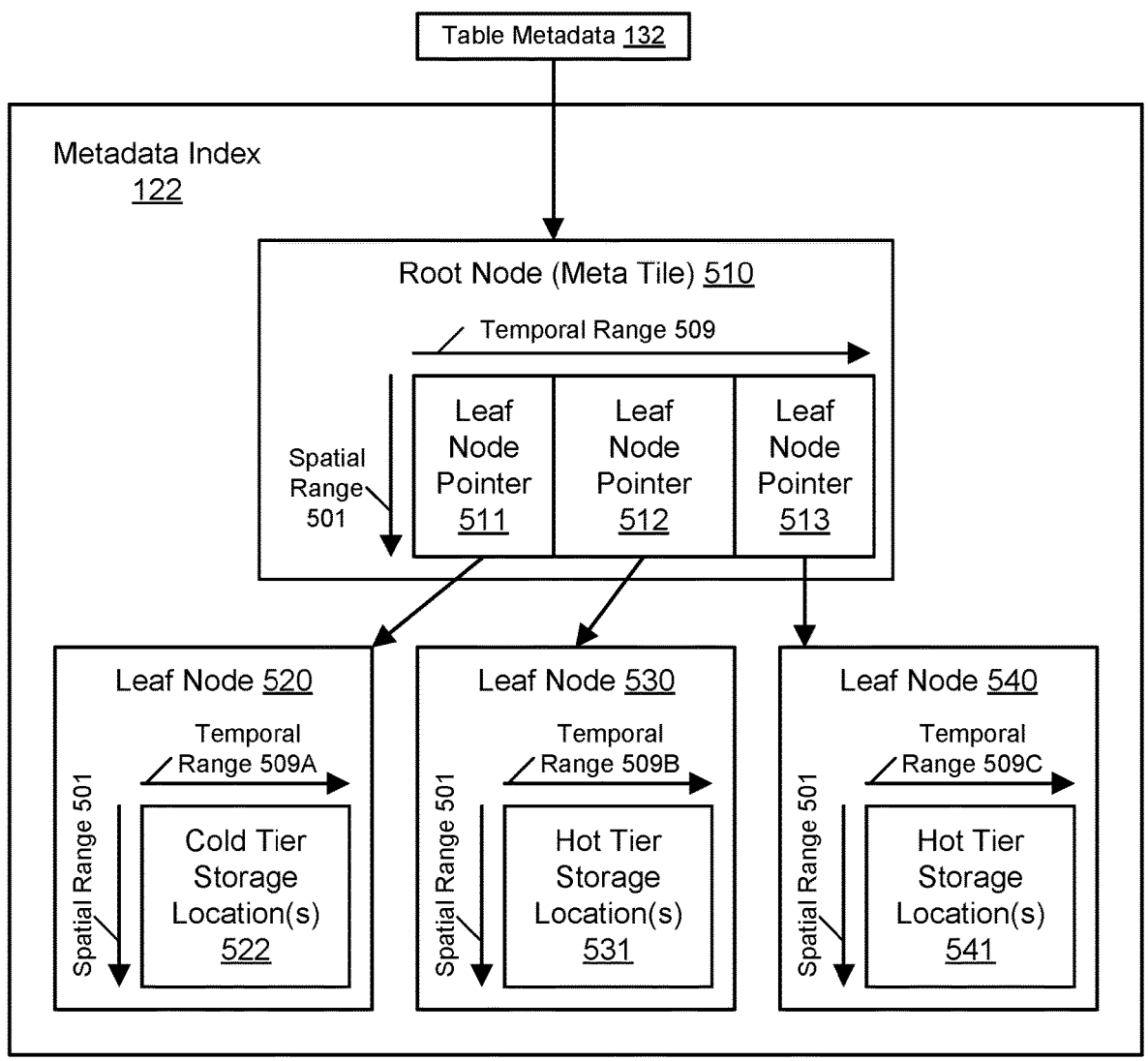
FIG. 5B illustrates an example of a metadata index referencing time-series data that has been moved from a hot tier to a cold tier, according to some embodiments.

FIG. 5B illustrates an example of a metadata index referencing time-series data that has been moved from a hot tier to a cold tier, according to some embodiments. As the data ages, time-series data may be moved (e.g., by the storage nodes 140) from the hot tier to a cold tier according to a retention policy. As shown in the example of FIG. 5B, to reflect this change, the leaf node 520 may be update to remove the hot tier information 521 and add information 522 indicating or referencing one or more storage locations in the cold tier 150N. In some embodiments, a given leaf node may include both hot tier information and cold tier information.

Figure 5C:
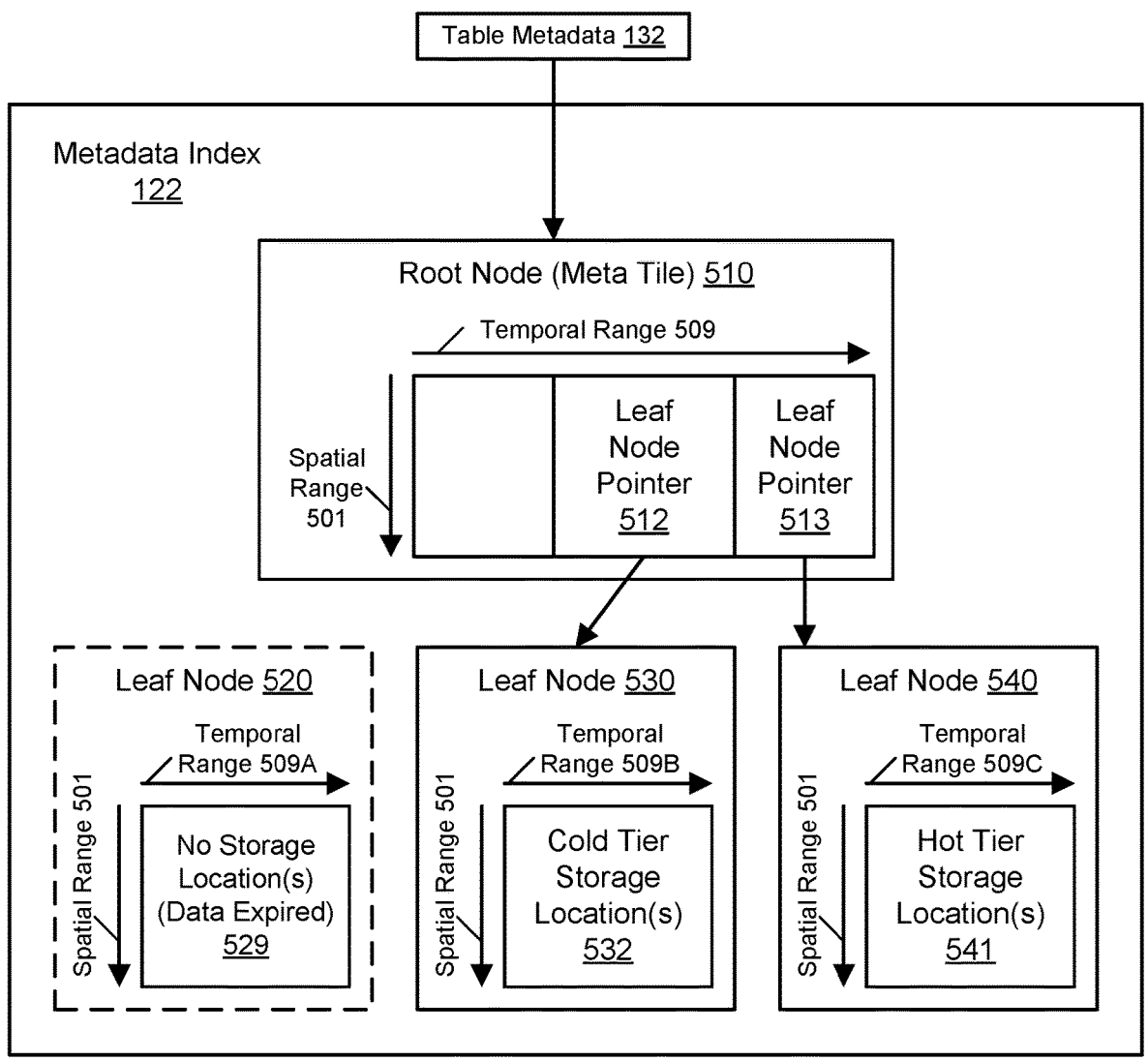
FIG. 5C illustrates an example of a metadata index referencing time-series data that has expired and been removed from the time-series database, according to some embodiments.

FIG. 5C illustrates an example of a metadata index referencing time-series data that has expired and been removed from the time-series database, according to some embodiments. When data sources are trimmed over time (e.g., due to expiration of data points according to a retention policy), corresponding nodes in the graph may also be removed. For example, at a later point in time reflected by the example of FIG. 5C, the data at the cold tier location(s) 532 may have expired and been removed from the database 100 altogether. Additionally, as more data is moved from the hot tier to the cold tier over time, the leaf node 530 may be updated to remove the hot tier information 531 and add information 532 indicating or referencing one or more storage locations in the cold tier 150N. As a result of the expiration and removal of data, the leaf node 520 may be updated to remove the cold tier information 532, leaving the node with no information 529 indicating or referencing storage locations of time-series data. When a leaf node contains no such information for any storage tier, the node may be removed from the metadata index 122. As shown in the example of FIG. 5C, the leaf node 520 may be removed along with the pointer 511 to that node. Similarly, when an index node includes no pointers to any child nodes (e.g., other index nodes or leaf nodes), that node may be removed from the metadata index 122.

Figure 6:
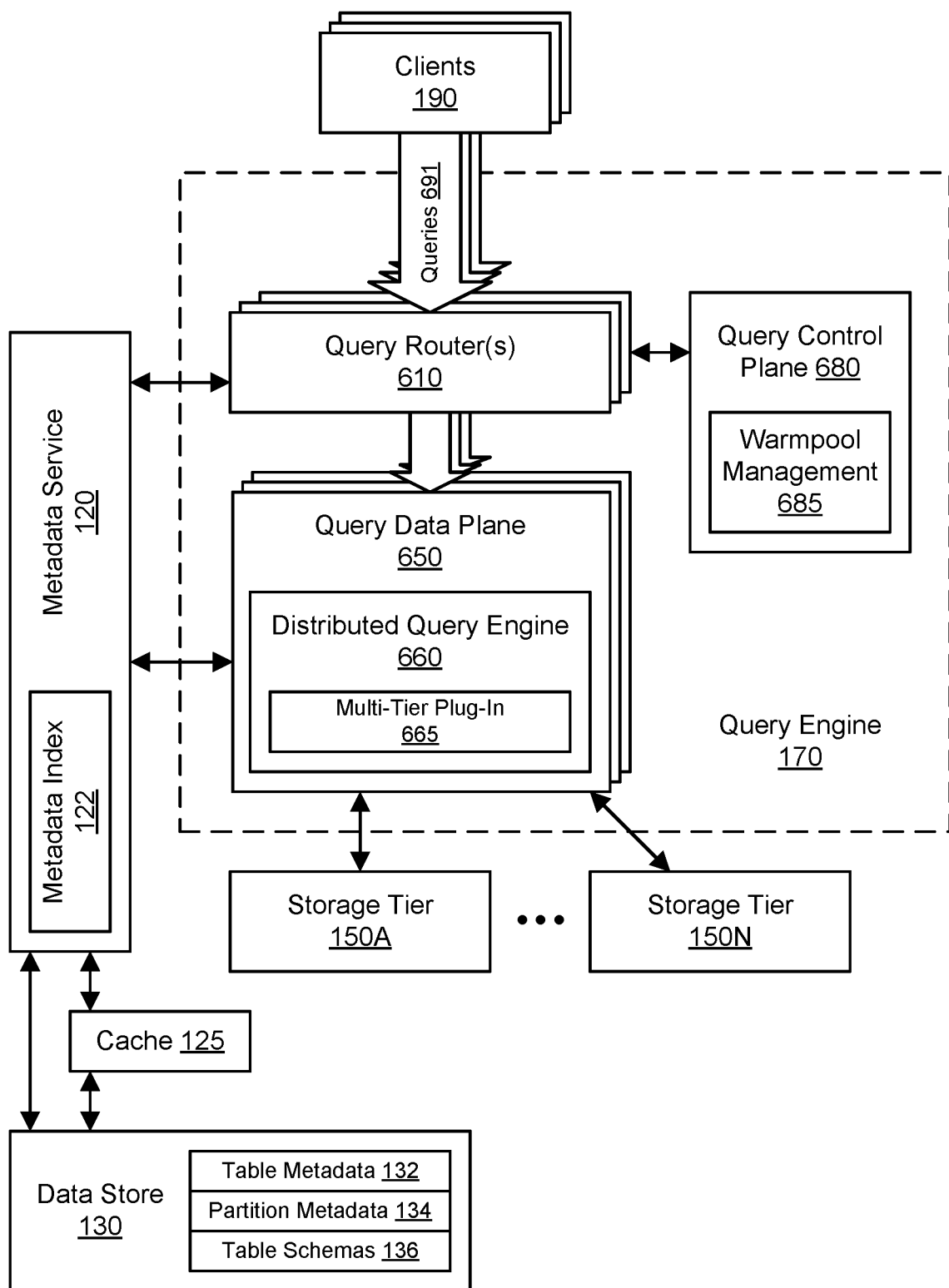
FIG. 6 illustrates further aspects of the query engine that implements adaptive querying of time-series data over tiered storage, according to some embodiments.

FIG. 6 illustrates further aspects of the query engine that implements adaptive querying of time-series data over tiered storage, according to some embodiments. An application load balancer may route queries 691 to one or more query router 610. The query router(s) 610 may consult with the metadata service 120 to obtain information such as table retention bounds, data statistics, and so on. The query router(s) 610 may use this information uses to determine the type of cluster to which the query is to be routed. The time-series database 100 may elastically scale the resources allocated to a specific customer, e.g., using a distributed query control plane 680 that performs management 685 of a "warm" (or pre-configured) pool of resources usable by a query data plane 650. The query resources may include, for example, clusters of workers that interact with the various storage tiers. Such resources may be allocated to execute queries that scale independently of the resources allocated for ingestion and storage of time-series data. The query resources may scale based (at least in part) on the query volume and amount of data analyzed by the queries. The query control plane 680 may track the health of the resources. The query data plane 650 may include a distributed query engine 660 that executes the queries by consulting with the metadata service 120 and obtaining the requested time-series data from the storage tiers 150A-150N.

The query router(s) 610 may authenticate the user request. The query router(s) 610 may implement admission control and throttling policies. The query router(s) 610 may provide appropriate authorization information for the query resources to access relevant information from the metadata service 120 and the storage tiers 150A-150N to execute the queries while ensuring least privileges access policy and other security requirements. The query router(s) 610 may, for asynchronous queries, generate a unique identifier for the query, enqueue the query to be processed asynchronously, and return the generated unique identifier to the user. The query router(s) 610 may, for synchronous and asynchronous queries, parse the query to validate (for syntax errors) and determine if the authenticated entity is authorized to execute the query. The query router(s) 610 may implement role-based access control and may verify and enforce the query language syntax. The query router(s) 610 may consult the metadata service 120 to determine the class of query that would determine the type of cluster which will be requested to execute the query. The query router(s) 610 may obtain a lease to execute the query based on the class of query. The query router(s) 610 may submit the query to a cluster in the query data plane 650. The query router(s) 610 may, for synchronous queries, return the first result page as a response to the original request. The query router(s) 610 may serve paginated responses for both synchronous and asynchronous queries. The query router(s) 610 may, for asynchronous queries, support requests for query status, fetch the query results, and cancel a query currently being executed. The query router(s) 610 may perform query tracking and book keeping for asynchronous queries.

After authorization, the query router(s) 610 may route the query request to a cluster in the query data plane 650 that can execute the request. In some embodiments, the cluster that will execute the query may be appropriately sized (e.g., with the appropriate number of instances for the specific type) for the query being executed. In some embodiments, the query data plane 650 may use two types of clusters: a small (single node) cluster to execute lightweight, low-latency queries and a multi-node cluster for all other query types. Low-latency synchronous queries for alerting scenarios. Such queries may follow a latency-optimized path where a small (single node) pre-warmed cluster is assigned to the customer for longer lease periods. The regular query clusters may execute all other query types.

The cluster size may be selected based at least in part on a parsed Abstract Syntax Tree (AST) for the query. The referenced table(s) and the time predicates may be extracted from the query to obtain metadata for the table from the metadata service 120. This metadata may be obtained from the metadata service 120 along with the table's retention bounds to identify the storage tiers which the query references. Using this information and a set of heuristics, the query router(s) 610 may determine if the query qualifies as a lightweight query. Depending on this outcome, the query router(s) 610 may determine the type of cluster to lease. The cluster leasing may be handled in coordination with the query control plane 680. Once a cluster is assigned, the query may be routed to that cluster for execution.

The query data plane 650 may include a distributed query engine 660 that parses a query, consults the metadata service 120 to optimize and generate a distributed query plan, executes the plan by processing the data read from the storage tiers, and returns the query results to the user. In some embodiments, the distributed query engine 660 may be implemented using a query engine that is extended to support the requirements specific to the time-series database 100, e.g., via one or more plug-ins. In some embodiments, the adaptive querying 175 may be performed using a plug-in 665 in the distributed query engine 660, where the plug-in permits querying of time-series data from different storage tiers having different storage formats and/or access characteristics. The storage tier 150A may be accessed using a different API or other access interface than the storage tier 150N, and the database 100 may execute queries that read data from the different storage formats without users having knowledge of the differences between the access interfaces of the storage tiers. Storage tiers may vary in storage format, and the database 100 may execute queries that read data from the different storage formats without users having knowledge of the differences between storage tiers. For example, the storage tier 150A may store time-series data in two-dimensional tiles 162 using storage resources 160A including MySQL database clusters. Using the metadata index 122, the query engine 170 may determine which of these tiles contains time-series data requested by a query (e.g., data within the spatial and temporal boundaries of one or more time series as defined by the query predicates). The query engine may then go to the tiles and read the data according to the particular storage format and the access interface of the storage tier 150A. The storage tier 150A may include two different tables: a time-series definition table and a time-series data points table. The definition table may indicate which time series are present in a particular tile. The data points table may indicate the data points, e.g., the measure, timestamp, and measure value tuples. In reading the requested time-series data to execute a customer query involving the storage tier 150A, the adaptive querying 175 may query both tables and join the results of the two queries. Data in the data points table may be tagged with a time series identifier that enables the join operation.

Figure 7:
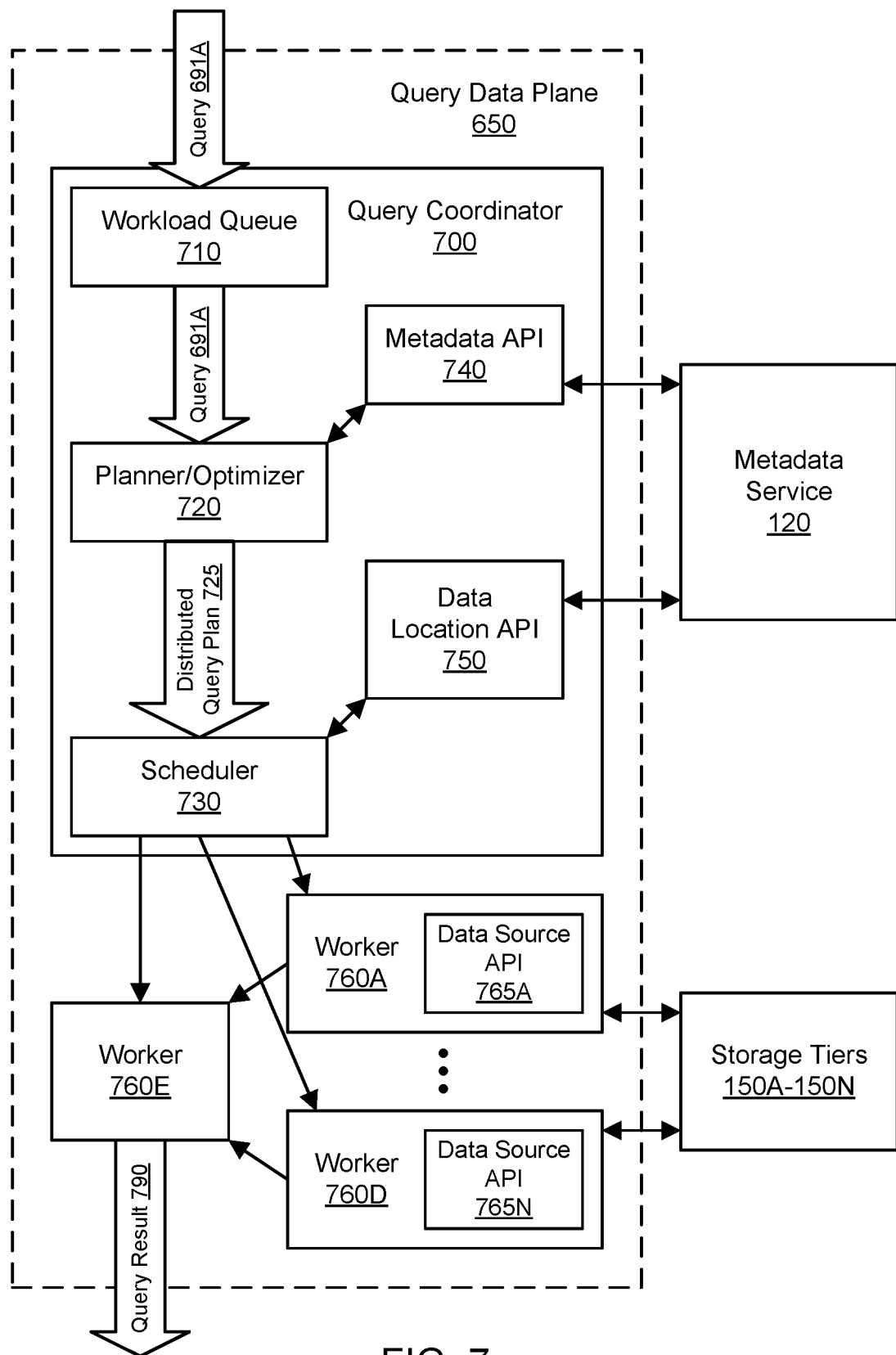
FIG. 7 illustrates further aspects of the query data plane that implements adaptive querying of time-series data over tiered storage, according to some embodiments.

FIG. 7 illustrates further aspects of the query data plane that implements adaptive querying of time-series data over tiered storage, according to some embodiments. A cluster in the query data plane 650 may include a specific node, called the query coordinator 700, that requests the query text from the query router(s) 610 and executes the query 691A. The coordinator 700 may receive a query 691A and place the query in a workload queue 710. A planner/optimizer 720 may take the query 691A from the queue 710 and generate a distributed query plan 725. The planner/optimize 720 may determine the query plan 725 based (at least in part) on consultation with the metadata service 120, e.g., to determine the schema for any time-series indicated by query predicates. A scheduler 730 may generate and send query tasks to various worker nodes (e.g., workers 760A through 760D and 760E) based (at least in part) on the query plan 725.

Once query execution completes, depending on the result size and the type of query (synchronous or asynchronous), the coordinator 700 may determine how to return the query result 790. For synchronous queries, if the result set is small enough to fit within a result page, then the results 790 may be streamed directly to the query router node which submitted the query 691A, which then streams the result to the client. For any other code path, the coordinator 700 may write the result 790 to an object an output bucket of a storage service. For synchronous queries, this object location may be returned to the query router(s) 610 which will paginate the result 790 from the object. For asynchronous queries, the coordinator 700 may update the tracking information for the query 691A with the location of the object so that the results 790 can be returned (in a paginated fashion) when the client invokes asynchronous read result API calls.

As discussed herein, the distributed query engine 660 may be implemented using a query engine that is extended to support the requirements specific to the time-series database 100, e.g., via one or more plug-ins. Each cluster may include one or more nodes where one node is designated as the coordinator 700 and other nodes as workers. For example, as shown in FIG. 7, the worker nodes may include worker 760A through 760D that read data from individual storage tiers 150A-150N as well as a worker 760E that combines that data into the query result 790. For single node clusters, the coordinator may also be configured as a worker. The distributed query engine 660 may include extensibility mechanism via plug-ins. The database 100 may extend the distributed query engine 660 with a specialized plug-in 665 that connects to the metadata service 120 as well as the storage tiers 150A-150N. Using a metadata API 740, the plug-in 665 may expose metadata relevant to a query 691A. Using a data location API 740, the plug-in 665 may specify data locations relevant to a query 691A. Using one or more data source APIs 765A-765N, the plug-in 665 may read the data during query execution. In some embodiments, the data source APIs 765A-765N (also referred to as access interfaces) may differ from one another and may be specific to particular storage tiers 150A-150N. Using this multi-tier plug-in 665, the query engine 170 may query data in the different storage tiers 150A-150N and support a schemaless system even though the base component(s) of the distributed query engine 660 may be strongly schematized.

In some embodiments, using the plug-in 665, the query data plane 650 may provide a unified view of a plurality of storage tiers that a single table spans. In some embodiments, using the plug-in 665, the query data plane 650 may hide the separation between the storage tiers to expose a unified API and data exchange format. In some embodiments, using the plug-in 665, the query data plane 650 may allow the query operators to read data from the different storage tiers by implementing the data source API. In some embodiments, using the plug-in 665, the query data plane 650 may support functionality such as predicate and aggregate pushdown to the storage tiers with co-located compute. In some embodiments, using the plug-in 665, the query data plane 650 may expose metadata to the query planner 720 (implementing the metadata API 740) by integrating with the metadata service 120. This metadata may include the table schema and column data types. The metadata service 120 may create a unified schema view for each table. The metadata service 120 may expose the data sources (e.g., data locations) that qualify a given set of predicates in the query. In some embodiments, using the plug-in 665, the query data plane 650 may expose partitioning information (implementing the data location API 750) to determine the parallelism and let the query planner 720 generate a distributed query plan 725. In some embodiments, using the plug-in 665, the query data plane 650 may support nanosecond precision timestamps. Timestamps may be stored as an unsigned 64-bit integer tracking time as nanoseconds elapsed since Unix time (tracked in UTC). In some embodiments, using the plug-in 665, the query data plane 650 may add a first-class time-series data type to the query language for specialized time series processing. In some embodiments, using the plug-in 665, the query data plane 650 may provide custom rewriting logic that leverages table metadata to rewrite queries such that data is generated in the time-series format during query execution. The time-series data type may extends an array data type of the distributed query engine 660 and further optimize such array processing to improve performance and scale. In some embodiments, using the plug-in 665, the query data plane 650 may support time series functions, such as interpolation or smoothing, that operate on the time-series data type.

During query planning, the distributed query engine 660 may invoke different plug-in APIs to determine the query execution plan, including a table metadata API 740 which obtains the schema and data type and one or more data location APIs 750 which also interacts with metadata to determine the location of data that needs to be scanned. During query execution, the distributed query engine 660 may invoke the data source APIs 765A-765N from the leaf (scan) nodes of the query execution plan distributed acyclic graph (DAG) that understands the physical storage of data and invokes the appropriate lower level APIs to read the data from the data source. The scan nodes in the query plan may use intelligence in invoking the appropriate APIs to read the data in the expected format for a particular storage tier. This information may be encapsulated as execution context information during query planning, which the worker nodes may use to determine the storage tier for a tile or partition at run time. If the tile or partition corresponds to a cold tier file (e.g., a Parquet file), then the worker node may use the Parquet reader plug-in to read the Parquet files and convert the data in an internal optimized columnar layout for the distributed query engine 660. If the tile is backed by hot or warm tier nodes, then the worker nodes may invoke a custom API to read the data from the appropriate node. These nodes may serve the data in an encoded columnar format so that the distributed query engine 660 can execute the query on compressed data and delay materialization of the rows.

The distributed query engine 660 may skip segments within a file using metadata, e.g., by reading data chunks rather than entire files where appropriate. The distributed query engine 660 may use a predicate pushdown functionality for pushing down predicates to the hot and warm tiers, to significantly reduce the amount of data being transferred across the network between the storage nodes and the query nodes. Partial aggregation push down may also result in significant reduction in the amount of data transferred over the network for a class of queries. Using partial push down, aggregates (e.g., sum, count, and so on) may be rewritten into partial and global aggregates, and the partial aggregates may be pushed closer to data in the hot or warm tier nodes, while global aggregation is performed in the query worker nodes.

As discussed herein, the database 100 may support queries of time-series data as a first-class concept. The time-series data type may include an array of tuples with one attribute being a timestamp and another being a measure value, where the values are sorted in ascending order of time. However, the database 100 may not store the data in this nested format. In some embodiments, such nested data may be created dynamically at query time. This time series creation at query time may be achieved through query rewriting. The query language may provide for constructs, either as table-valued functions or aggregation functions, for a user to create a time series within a query. The database 100 may internally rewrite these constructs into queries on the flat data model using metadata tracked by the metadata service 120. For example, if the user query 691A requests the time series with a specific measure (e.g., cpu_time), then the metadata service 120 may provide a mapping of cpu_time to the set of dimension names for the time series where cpu_time appeared. This information may then be used to rewrite the query as a grouping by the dimension names. Such rewriting may be performed during query parsing to enhance the user experience while supporting time series as a first class concept. The database 100 may use an array_agg primitive function of the distributed query engine 660 to construct the vector representation of time series. This function may create time-series vectors during query execution acting as aggregate functions used in conjunction of grouping by dimension names. The distributed query engine 660 may provide support for parallelizing such array creation, using similar concepts of rewriting the aggregate into partial and global aggregates.

Figure 8:
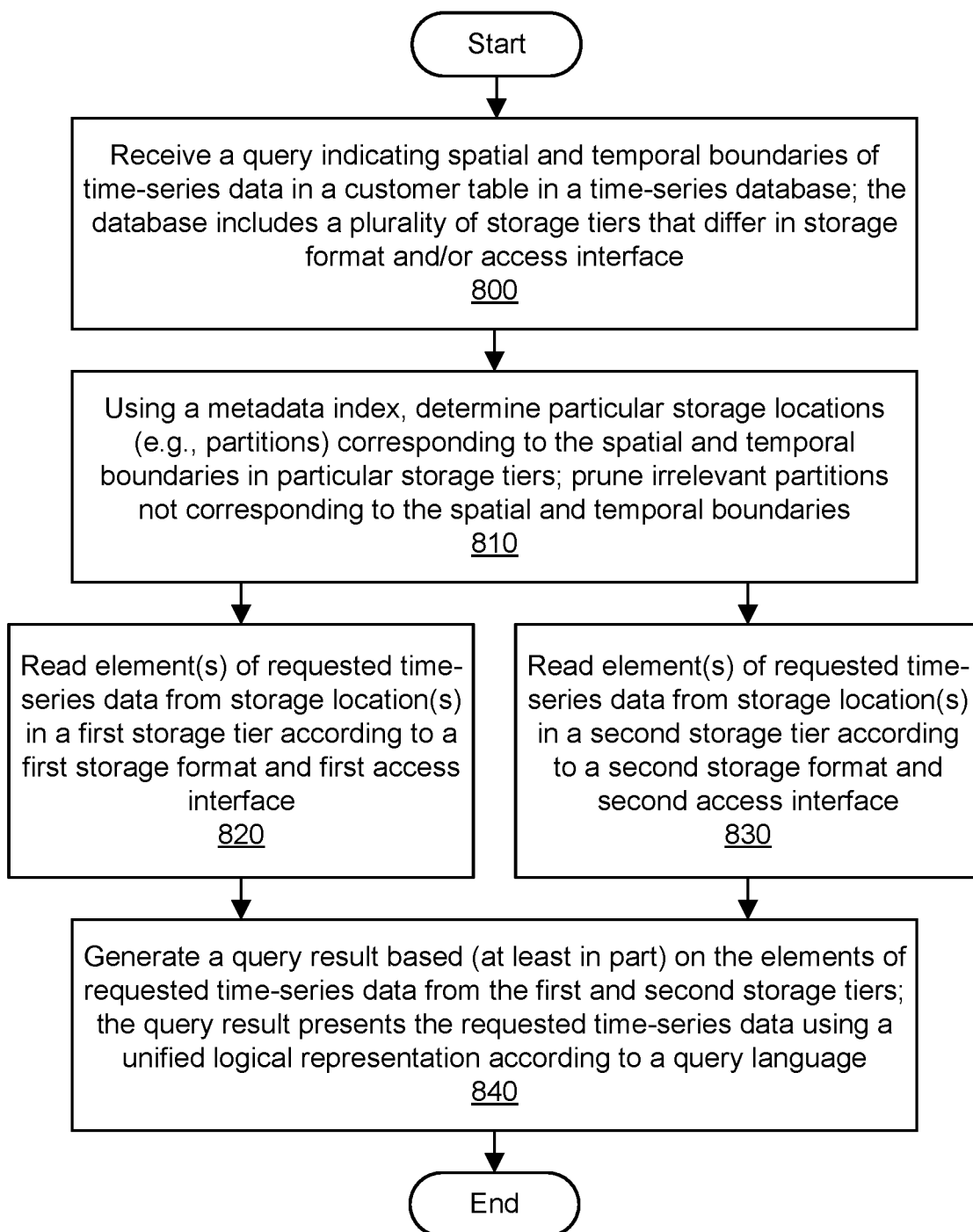
FIG. 8 is a flowchart illustrating a method for adaptive querying of time-series data over tiered storage, according to some embodiments.

FIG. 8 is a flowchart illustrating a method for using a scalable metadata index for a time-series database, according to some embodiments. As shown in 800, a query may be received by a query processor of a time-series database, e.g., based on user input via a user interface or input via a programmatic interface. The query may include or indicate spatial and temporal boundaries of requested time-series data in a particular customer table. For example, the spatial boundaries may include one or more specific values for keys or a range of values for keys. The temporal boundaries may include a starting time and an ending time. The spatial and temporal boundaries may be implicitly indicated by the query, e.g., using one or more SQL predicates.

The time-series database may store time-series data of a plurality of time series using a plurality of storage resources, e.g., across different storage tiers. One or more of the storage resources in a first storage tier store a first portion of the time-series data using a first storage format and may be accessible using a first access interface (e.g., an API or other programmatic interface permitting clients to request data reads). One or more of the storage resources in a second storage tier store a second portion of the time-series data using a second storage format differing from the first storage format and may be accessible using a second access interface (e.g., an API or other programmatic interface permitting clients to request data reads) differing from the first access interface. The customer query may be written on a logical view of time-series data that is independent of the underlying storage in the various storage tiers. Adaptive query processing may enable customers to write queries without knowledge of the specific storage locations and storage technologies in which their time-series data is stored. In some circumstances, the query may ask for time-series data that happens to be stored in two or more storage tiers (e.g., following migration of some of the data from the hot tier to the cold tier).

As shown in 810, the database may determine a plurality of storage locations corresponding to the spatial and temporal boundaries associated with the query. The database may determine these relevant locations at which to read the requested time-series data while pruning out other storage locations that do not correspond to the spatial and temporal boundaries associated with the query. The query engine may determine which storage tier(s) host the partitions relevant to the query. The storage tier(s) may not be explicitly specified by the query. The query engine may adaptively determine how to read the underlying data from different storage tiers according to the different storage formats, storage technologies, and/or access characteristics (e.g., APIs or access interfaces through which read requests are submitted and results are returned) of the storage tiers. The adaptive querying may identify relevant partitions and other storage locations based (at least in part) on the table schema stored using the metadata index. To build a query plan, one or more paths through the metadata index may be selected based (at least in part) on the spatial and temporal boundaries associated with the requested time-series data. In some embodiments, nodes in the metadata index may be traversed, beginning from the root node, to determine the storage locations of the requested time-series data in the storage tiers. Traversal may include selecting paths (e.g., pointers to index nodes or leaf nodes) whose spatial and temporal boundaries overlap with the spatial and temporal boundaries associated with the query. As a result of the traversal, one or more of the leaf nodes may be reached or selected, and one or more other leaf nodes may not be reached or selected. The selected leaf nodes may correspond to tiles whose spatial and temporal boundaries overlap with the spatial and temporal boundaries associated with the query. The selected leaf nodes may include or indicate storage locations of time-series data desired by the query in the various data sources (e.g., database clusters or file storage).

As shown in 820, one or more elements of the requested time-series data may be read from one or more of the identified storage locations in the first storage tier. The first storage tier may be queried for these element(s) using the first access interface (e.g., an API). These element(s) may be read in the first storage format associated with the first storage tier. The storage tiers may vary in storage format, and the database may execute adaptive querying by reading data from the different storage formats without users having knowledge of the differences between storage tiers. For example, the first storage tier may store time-series data in two-dimensional tiles using storage resources such as MySQL database clusters. Using the metadata index, the adaptive querying may determine which of these tiles contains time-series data requested by a query (e.g., data within the spatial and temporal boundaries of one or more time series as defined by the query predicates). The adaptive querying may then go to the tiles and read the data according to the particular storage format and the access interface of the first storage tier. The first storage tier may include two different tables: a time-series definition table and a time-series data points table. The definition table may indicate which time series are present in a particular tile. The data points table may indicate the data points, e.g., the measure, timestamp, and measure value tuples. In reading the requested time-series data to execute a customer query involving the first storage tier, the adaptive querying may query both tables and join the results of the two queries. Data in the data points table may be tagged with a time series identifier that enables the join operation.

As shown in 830, one or more elements of the requested time-series data may be read from one or more of the identified storage locations in the second storage tier. The second storage tier may be queried for these element(s) using the second access interface (e.g., an API). These element(s) may be read in the second storage format associated with the second storage tier, e.g., in a different format than that of the first storage tier. For example, the second storage tier may store time-series data in files. Using the metadata index, the adaptive querying may determine which of these files contains time-series data requested by the query (e.g., data within the spatial and temporal boundaries of one or more time series as defined by the query predicates). The adaptive querying may then go to the files and read the data according to the particular storage format and the access interface of the second storage tier. The files may be stored in a structured format, such as the Parquet file format, that provides efficient as well as performant flat columnar storage of data. The files themselves may include indices or other metadata (e.g., file footers) that indicate what data is contained in the files. Using this metadata in combination with the query predicates, the adaptive querying may identify and read only one or more relevant chunks from a file and not read other (irrelevant) chunks from the file. The use of such chunk queries may optimize the use of network resources, memory resources, and so on.

In various embodiments, the operations shown in 820 and 830 may be performed serially or concurrently. In some embodiments, query execution may include reading time-series data from only one storage tier. In some embodiments, query execution may include reading time-series data from two or more storage tiers.

As shown in 840, a query result may be generated based at least in part on the time-series data read from the various storage tiers. The query result may be expressed according to a structured query language, e.g., at least a subset of ANSI SQL. The query result may not specify the storage tier(s) from which data was read. The query result may represent an analytical function or aggregation performed on the time-series data read from the storage tier(s). The adaptive querying may transform query results from each storage tier from a source format associated with that tier into a unified target format. The adaptive querying may generate the overall query result based (at least in part) on the table schema stored using the metadata index, e.g., such that the query results may present data read from different storage tiers in a unified logical representation based (at least in part) on the schema. By converting data from various source formats of the storage tiers to a common target format, the adaptive querying may merge the results from the one or more storage tiers into the appropriate internal view to create a unified logical representation of the time-series data that is relevant to the query. By automatically translating between the logical representation of time-series data and the underlying physical storage of that data, the adaptive querying may allow customers to write queries in a consistent manner, regardless of (and without customer knowledge of) the differences between storage tiers in which their data is stored.

Figure 9:
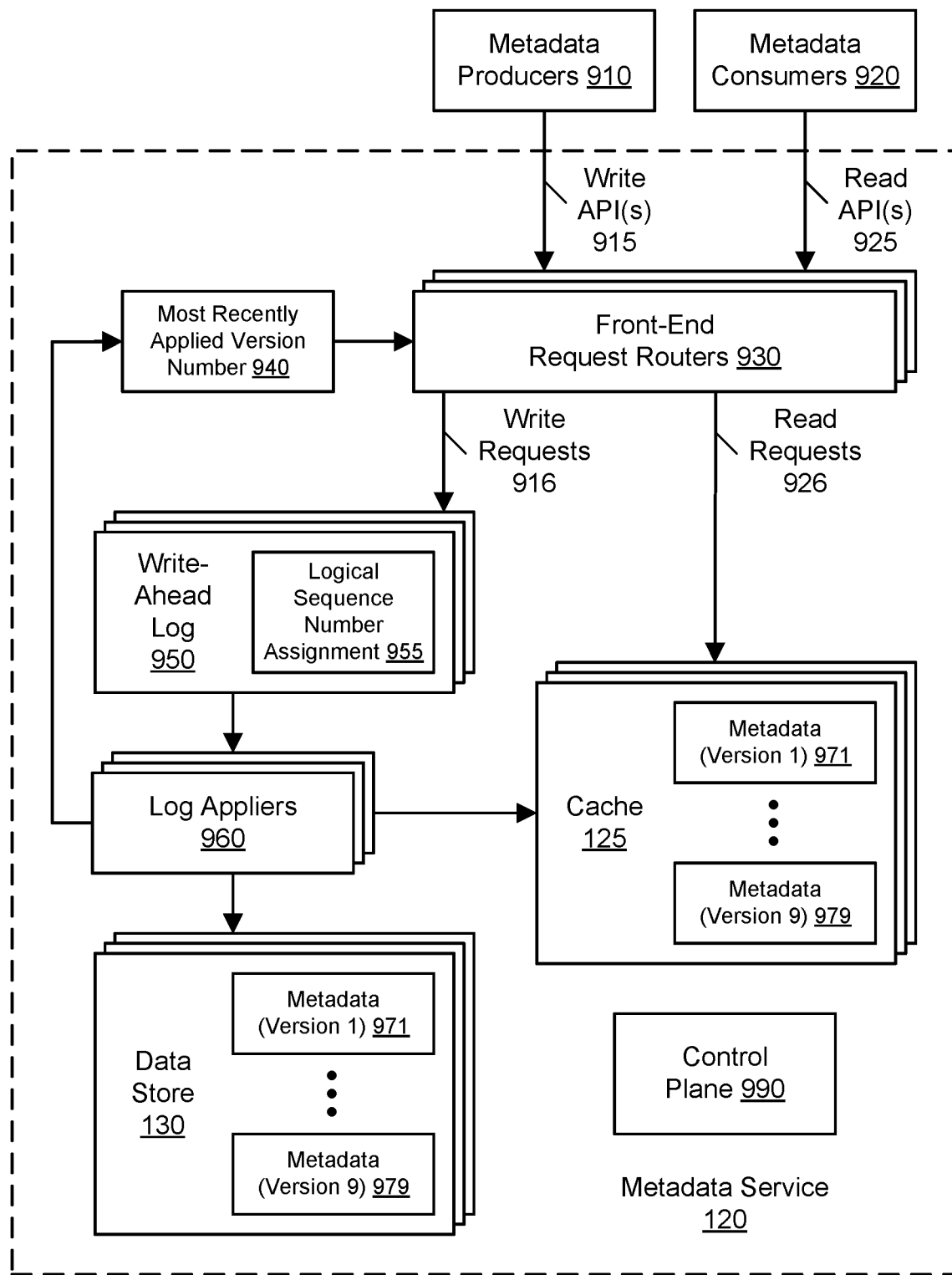
FIG. 9 illustrates an example system environment for versioned metadata management for a time-series database, according to some embodiments.

FIG. 9 illustrates an example system environment for versioned metadata management for a time-series database, according to some embodiments. As discussed herein, the time-series database 100 may include a metadata service 120 that maintains metadata such as metadata index 122. The metadata service 120 may represent a centralized component that authoritatively, consistently, and durably stores the locations, schemas, and other metadata of time-series data. To maintain high availability and high throughput for ingestion of time-series data, the time-series database 100 may use the metadata service 120 to identify the locations to which incoming time-series data points within particular time and space ranges are routed. To maintain high availability and high throughput for queries of time-series data, the time-series database 100 may use the metadata service 120 to identify the locations to which queries for particular query predicates (e.g., time and space ranges) are routed. The metadata index 122 may be highly scalable and highly available. In some embodiments, the metadata index 122 may support fast lookups (e.g., millisecond lookups) for billions of two-dimensional tiles and trillions of ingested data points per day. The metadata index 122 may be built on a data store 130 (e.g., a NoSQL data store) that provides scalability and durability using persistent storage of time-series metadata. The metadata service 120 may leverage a cache 125 for performance and scalability, e.g., for a high volume of reads. The metadata service 120 may distribute workload heat evenly across the caching fleet to prevent "hot spots." In some embodiments, the metadata service 120 may implement metadata version management using a write-ahead log for data other than time-series data, e.g., to maintain versions of metadata (e.g., schemas, policies, and so on) for other data structures and data sets.

The metadata managed by the metadata service 120 may be generated by producers 910 such as the ingestion routers 110 and storage nodes 140. The metadata managed by the metadata service 120 may be consumed by consumers 920 such as the query engine 170. In some embodiments, the metadata service 120 may store metadata for user-defined retention bounds and policies, e.g., as table metadata 132. Table metadata 132 updates may be triggered by operations such as table creation, table updating, table deletion, and so on. In some embodiments, the metadata service 120 may store metadata for the mapping of partitions to data locations, e.g., as partition metadata 134. In some embodiments, the metadata service 120 may store metadata for table schemas 136, e.g., the columns and their data types as inferred upon ingestion and not necessarily explicitly defined by users. In some embodiments, the metadata service 120 may store time-series specific metadata, e.g., a mapping of a measure name to one or more sets of dimension names that may be used to create a time-series view for customers. In some embodiments, the metadata service 120 may store aggregated table statistics, such as number of rows in each partition, number of distinct values per column, number of nulls per column, and so on.

Table schemas 36 may be versioned, e.g., such that any addition of one or more dimension names to a schema results in a higher version number. Using versioning of table schemas 136, schema changes may be detected at runtime, e.g., when queries are performed. The database 100 may update a table schema as soon as new data is ingested into the database 100 and before the data is queryable. The database 100 may provide support for schema and metadata versions as schemas and metadata change over time on ingestion of new data. The database 100 may allow the query engine 170 to work with a specific snapshot of the schema to ensure the correctness of query results. In some embodiments, to enable horizontal scaling of requests and data volumes, components of the metadata service 120 may be partitioned by table identifiers (table ID or TID) corresponding to user-created tables in the time-series database 100. For example, the metadata in the data store 130 and cache 125 may be partitioned by table ID.

Front-end request routers 930 may implement one or more application programming interfaces (APIs) of the service 120 to permit other components of the database 100 to interact with the metadata. For example, metadata producers 910 may use one or more write APIs 915 to write metadata updates to the service 120 via the front-end request routers 930. As another example, metadata consumers 920 may use one or more read APIs 925 to read versions of metadata from the service 120 via the front-end request routers 930. The front-end request routers 930 may comprise a fleet of nodes, fronted by a load balancer, that appropriately routes write requests 916 and read requests 926. The front-end request routers 930 may implement authentication and authorization for internal components of the time-series database 100 to restrict blast radius and implement least access privileges. Each component that interacts with the service 120 may authenticate itself, and based on the credentials, be granted read-only access or read/write access. For example, components of the query engine 170 may have read-only access, while the storage nodes 140 may have read/write access.

A write-ahead log 950 may comprise a persistent log that stores data indicative of logical operations corresponding to metadata updates. The logical operations may include inserts, updates, and deletes of metadata elements. In some embodiments, every API call that writes metadata updates to the metadata service 120 (e.g., including inserts, updates, and deletes) may be appended to the log 950. The log 950 may be horizontally partitioned by table ID such that the log may scale to large numbers of tables and also support high append throughput within a single table ID sufficient to meet the write scale requirements of the service 120. The write-ahead log 950 may provide the first level of durability for all changes made to metadata. The write-ahead log 950 may provide a total ordering with a dense sequence number for changes made to a given table ID. The log 950 may include a component for logical sequence number (LSN) assignment 955 to implement the ordering scheme for metadata versions. Such a total order may simplify how these updates are applied to the persistent data store 130 and cache 125, may simplify how the cache is kept consistent, and may support snapshot and session consistency semantics for the metadata read APIs 925. In some embodiments, the write-ahead log 950 may be encrypted with managed keys within the time-series database 100. One or more log appliers 960 may consume the log changes and atomically apply those changes to the backing persistent data store 130 and the cache servers 125. For example, a log applier may consume a log entry corresponding to a metadata update and apply that update to the earlier version of the metadata in a cache 125 node, thus generating a new version of the metadata that includes the metadata update. The write-ahead log 950 and log applier(s) 960 may be partitioned by table ID for horizontal scaling.

The cache 125 may be used to meet low latency requirements for the read APIs 925. The cache 125 may not only cache the metadata but also index and lays out the metadata in ways that allow it to efficiently serve requests to locate data sources relevant to a query or to return a schema or a mapping of measure names to dimensions. To deal with the scale requirements of the database 100, the cache 125 may be partitioned across several servers. Within a given server, the cache 125 may span beyond memory and may leverage persistent storage with "lazy loading" of data into memory.

A control plane 990 for the metadata service 120 may maintain the partition state, e.g., the mapping of the table ID to the appropriate log applier or the cache server(s). The control plane 990 may track the health of the partitioned components such as the cache 125 and the log applier(s) 960. The control plane 990 may recover such components when a failure is detected. In some embodiments, the control plane 990 may implement replication of metadata versions and/or metadata storage resources, potentially using the write-ahead log 950. For example, the control plane 990 may copy a particular metadata version from the data store 130 to the cache 125 and then use the log 950 to perform a replay of logical operations for metadata updates occurring after the copied version.

The front-end request routers 930 may include stateless servers that are fronted by a load balancer. The request routers 930 may be automatically scaled based on the request load. For the write APIs 915, based on the parameters of the request, the request router may create the log record for the API call and then append the log entry to the log 950. Each API call may be associated with a table ID which the request router uses to determine the table-ID-specific write-ahead log to which the payload for the API is written. The write-ahead log 950 may be partitioned by table ID such that a log sequence number, monotonically increasing for a given table ID, totally orders all log entries for a given table ID. Once the append to the log succeeds for a metadata update, the write API call may return success.

For the read APIs 925, based (at least in part) on the API under consideration, the request routers 930 may either access the persistent data store 130 to process the request or send the request to the cache servers 125. For example, to read the table retention policy, a read request can be efficiently served directly from the persistent data store 130. On the other hand, the API to determine the partitions/tiles that are relevant to a given set of query predicates (or a bounding box) may be routed to the cache 125 to efficiently prune out irrelevant data sources. Because the cache 125 may be partitioned by table ID, the request routers may cache the partition-to-node map in order to route the requests to the appropriate cache server responsible for the table ID associated with the request.

The write-ahead log 950 may be implemented using a durable and highly-available service that provides atomic appends for metadata updates. To allow horizontal scaling of log append throughput to support millions of user-created tables, the log 950 may be partitioned and horizontally scaled out. Because the write throughput requirement per table ID may be low, to simplify the logic of maintaining a partitioned write-ahead log 950, a table in a persistent data store (e.g., a NoSQL data store) may be used to create a log partitioned by table ID. Use of such a data store may provide additional benefits in terms of auto-partitioning and scaling, encryption at rest, and better integration with deployment and operational tooling. In some embodiments, a schema for the table implementing the partitioned log may include columns for table ID, log sequence number, and payload. The table ID may be the partition key for the table, and the log sequence number (LSN) may be the range key. In various embodiments, components of the metadata service 120 may be partitioned at different levels of granularity such as table ID, database ID, account ID, and so on. The metadata service 120 may tend to provide better scaling at a finer level of granularity.

The request routers 930 may determine the most recently applied version number 940, e.g., the largest LSN if the sequence numbers are monotonically increasing. The most recently applied version number 940 may be stored in a table or other storage resource, e.g., by the log appliers 960. When writing a new log record, the request router processing the API call may read the largest LSN for a given table ID (using a single call to the data store), increment it by one, and make a conditional write request with the new log entry corresponding to a metadata update. This conditional write may ensure that every log entry has a unique LSN, the LSNs are strictly increasing, and there are no gaps (or holes) in the log for a given table ID. The payload for a metadata update in the log 950 may include the serialized form of the API request and its parameters. In some embodiments, the request routers 930 may determine new logical sequence numbers by incrementing current (most recently applied) version numbers. In some embodiments, the write-ahead log 950 may determine new logical sequence numbers, e.g., by using a logging service that performs atomic append operations for metadata updates. In some embodiments, the request routers 930 may write directly to the cache 125, e.g., without using the write-ahead log 950 if the write-ahead log is blocking. The cache 125 may reject such a write attempt if the update has an out-of-order LSN.

The log appliers 960 may process the tail of the log 950, deserialize the payload to identify the type of update, and then apply the updates to the persistent data store 130 and the cache 125 based on the semantics of the API that the log records. Depending on the type of operation, this update may insert/update multiple records in the persistent data store 130 (potentially spread over multiple tables). In some embodiments, every update may be applied to the persistent data store 130 and to the cache nodes 125 with multiple replicas per partition. In some embodiments, these updates may be applied transactionally to ensure the ACID (Atomicity, Consistency, Isolation, Durability) properties and support the consistent snapshot semantics for the reads. Given that updates have a total order, this application across multiple entities may be simplified by having a logical applier for each entity that needs to process the updates.

The log appliers 960 may be partitioned by table ID such that a particular log applier is responsible for a certain set of table IDs. Each log applier may read the tail of the log 950, starting with the smallest LSN it has not applied yet. For each log entry, the log applier may deserialize the log message to identify the API call and parameters. If the request is to add a new partition or a data location for the cold storage tier (e.g., a Parquet file), then the log applier may update the data locations. If the API request is to change the schema of the table because a new column was detected in ingested time-series data, then the log applier may update the schema tracked for a table. Each update may store the LSN as its version number associated with the entry such that not only are the updates applied in log order, but also a read can determine which updates are visible depending on the version the read API call wants to read. This update application may provide timeline (or prefix consistency) semantics for reads within a table ID. The persistent data store 130 may be multi-versioned and may provide read snapshots within a specific table ID.

In some embodiments, the metadata producers 910 may have an at-least-once notification contract for metadata changes. The log applier may ensure idempotent application of metadata changes. The exact idempotence logic may depend on the API calls. For example, additions may be idempotent, such that adding the same column for a table ID or the data source for a specific partition multiple times would result in newer versions of the same requests being ignored. For schemas, updates may be allowed on the last seen time for the column, which may be idempotent by definition where an update is applied only if the newer timestamp is greater than the currently recorded timestamp. For data source (storage resource and storage location) updates, the service 120 may rely on the metadata producer to provide an idempotency token. Data location deletes may be logical deletes such that the end LSN is set to mark a location as invisible to new queries. In some embodiments, any API call to delete an entry that is logically deleted once may produce no new result.

Each log applier may be assigned a set of table IDs for which it is responsible. The control plane 990 may manage these assignments as well as the health of the log applier. Each log applier may be bootstrapped with the list of table IDs and the destination endpoints for the persistent data store 130 and the replicas of the cache server 125. The log applier may begin its processing by looking up the information for each table ID from the last-applied LSN table and then restart processing the log from the LSN immediately following the last-applied LSN. The control plane 990 may also manage the health of the log applier partitions.

The metadata storage resources, such as the data store 130 and cache 125, may implement multi-version metadata storage. As shown in the example of FIG. 9, the data store 130 may store different versions of the metadata for a particular table, such as metadata (version 1) 971 through metadata (version 9) 979. Similarly, the cache 125 may store different versions of the metadata for a particular table, such as metadata (version 1) 971 through metadata (version 9) 979. By implementing multi-version metadata storage, a read request for metadata may be processed using the most recently applied metadata version or a specified version number or timestamp. By implementing multi-version metadata storage, a point-in-time restore request may be processed using any version number or timestamp specified by the request, e.g., to restore a failed cache node.

The metadata service 120 may support consistent metadata reads. A consistent view of metadata for a specific query may be important for query correctness. The query engine 170 may rely on the knowledge of the dimensions, measures, and mappings of dimensions to measures to perform query rewrites and also to provide a schematized view of data (as required for efficient query processing and projection pushdown). In some embodiments, because customers of the database 100 do not explicitly specify this metadata, it may be inferred during data ingestion. To ensure correct query results, the correct schema may be tracked for any data location made visible to query. During the query plan generation, the query engine 170 may make multiple calls to the APIs of the metadata service 120. Because the calls may be made over stateless HTTPS requests, the calls may be processed by different replicas. The consistent snapshot semantics may maintain the above invariant for correctness while allowing the requests to be routed to different replicas. In addition, in the presence of operations such as compacting multiple files into one, the database 100 may ensure that either the old set of files or the new set of files are visible. The consistent snapshot semantics may ensure correctness in these situations.

The metadata read APIs 925, such as getting the schema for a specific table ID or getting the data locations relevant for a query with certain temporal and spatial predicates, may provide an option for the caller to specify an LSN of the snapshot. If no snapshot LSN is provided by the caller, then the node serving the request may pick the latest LSN 940 that has been applied by using the last-applied LSN table. The API may then be processed to return results that are valid according to the constraints that all log entries up to the specified LSN have been applied and any changes that have a LSN greater than that specified are not made visible. If the replica processing the request is slow to respond, the request may either block for a specified time period or fail with a specific error code so the caller can retry. Each such call may also return the LSN for which the request was processed. To provide a consistent snapshot across the multiple API calls, the first call made during planning of a query may not pass an LSN. The LSN returned by the first call may be obtained, and then any subsequent calls made during planning of that query may pass along the LSN, thus allowing these calls to read metadata as of that LSN snapshot.

To track which data items are visible to an API call, the service 120 may use a combination of semantics of the data stored in different data store 130 tables and the LSNs. For example, to determine if a data location for a specific partition is visible to a query, every data location entry for a table ID, in addition to its partition bounds, may also has the starting LSN (when the entry became visible) and the ending LSN (when the entry was deleted). In some embodiments, for a data location to be returned as a result of the getDataLocations API call, the partition bounds must be intersecting with the desired bounds for that call, and the record should be visible as of the specified snapshot LSN for the API call. Thus if the table schema was read as of LSN L1, and a new data source were added as of LSN L3 (where L3>L1), then a call to get the relevant data locations tagged with LSN L1 as the snapshot should not return the new data location added at L3. Similarly, when adding a new data location with a specified LSN, the service 100 may first add the schema updates, then write the data location, and finally update the last-applied LSN record, to ensure that schema and data locations are made visible as of a snapshot only after all the relevant information has been processed. Similarly, when replacing a set of data locations with another newer set of data locations, the older location's ending LSN may be updated to the LSN of the entry which is replacing the locations, the new locations may be added with starting LSN, and then the last-applied LSN may be updated.

The cache 125 may provide a consistent snapshot of metadata for a specific table ID. This consistent snapshot may be essential for correct query planning. Cache corruption (both logical and physical) may be detected, e.g., by the control plane 990. The service 120 may reconstruct a failed cache from the persistent data store 130 or a different replica. In some embodiments, every cache server may be responsible to cache data and serve requests. The assignment of a table ID to a cache node may be made by the control plane 990. The mapping of a table ID to the physical set of servers caching data corresponding to the table ID may be maintained in a table in a persistent data store (e.g., a NoSQL data store) with table ID as the partition key. The front-end request routers 930 may use a simple time-to-live (TTL)-based least recently used (LRU) caching mechanism that caches this mapping and asynchronously refreshes the entries.

In some embodiments, every cache server may be assigned a list of table IDs which it is tasked to cache and serve. The control plane 990 may make the assignment when a new table ID is registered. The control plane 990 may change the table ID assignments for balancing the load on the cache or for the metadata size. Because the request routers 930 may cache the mapping of a table ID with its set of cache servers, after a change in membership, a request router may send a request to a cache node that is no longer serving the particular table ID. The cache node may reject such requests and can either redirect the request to the new cache node or send an explicit error code which forces the request router to read the most recent mapping stored in the table in the persistent data store and update its cache.

In some embodiments, the service 120 may track schema changes for each table ID using the persistent data store 130. The table used for tracking schema changes may be partitioned by table ID and may indicate the column name, column type, heartbeat time, and first logical sequence number (LSN). The column name may be used as the sort key. The column type may encode the data type. The heartbeat may represent the latest time at which data was inserted into the columns. The first LSN may indicate the logical sequence number at which the column was first seen from the write-ahead log for the table ID. Schema information (e.g., dimensions, types, and measures) may be tracked over time, e.g., at day granularity. A table schema may continue changing with new records being inserted with new dimension and measure names. Old StartTime and LastUpdatedTime columns may define the time range of a dimension or measure in which it is active. A dimension's StartTime can go back in time when records are inserted out of order or in the event of backfill. Similarly, the LastUpdatedTime can change frequently as new records with later time than the LastUpdatedTime are ingested.

In some embodiments, the metadata service 120 may store a schema according to the following data structure:

```
{
  "TableName": "tableName",
  "TableId": "TableID",
  "Version" : <version number",
  "CreatedDate": <date>
  <"Extra Metadata if any">,
  "Date":[
  "Version" : <version number",
  "Dimensions":
  [
    {
       "DimensionName" : "Name",
       "Type": ["type1","type2",...]
       "StartTime": <Date>,
       "LastUpdated": <Date>
    }
    ...
  ]
  "Measures":
  [
    {
       "MeasureName": "Name",
       "Type": ["type1","typ2",...],
       "DimensionMappings" :
       [
         {
           ["DimensionName1","DimensionName2",...],
           "StartTime": <Date>,
           "LastUpdated": <Date>
         },
         {
           ["DimensionName1","DimensionName2",...],
           "StartTime": <Date>,
           "LastUpdated": <Date>
         }, ...
       ]
     }
   ]
  ]
}
```

In some embodiments, the data store 130 may track table schemas in a cell. This table may include one record for each of the dimension, measure, and measure-to-dimension mappings for each time interval for each table. The table may use table ID as the partition key and the name column as the sort key. In some embodiments, the data store 130 may store a dimension record using the following data structure:

```
{
  "tableId":"<UUID>",
  "Name": "d_<dimensionName>",
  "RecordType":"Dimension",
  "FirstSeen":"Date",
  "LastSeen":"Date",
  "types": ["type1","type2", . . . ],
  "Version":<number>
}
```

In some embodiments, the data store 130 may store a measure record using the following data structure:

```
{
  "tableId":"<UUID>",
  "Name": "m_<MeasureName>",
  "RecordType":"Measure"
  "types": ["type1","type2", . . . ],
  "StartTime":"Date",
  "LastUpdatedTime":"Date",
  "Version":<number>
}
```

In some embodiments, the data store 130 may store a measure-to-dimension mapping using the following data structure:

```
{
  "tableId":"<UUID>",
  "Name": "map_Metric_<MD5(dimensions)>",
  "Dimensions": ["Dimension1","Dimension2", . . . ],
  "MetricName":"name",
  "RecordType":"Map",
  "StartTime":"Date",
  "LastUpdatedTime":"Date",
  "Version":<number>
}
```

Figure 10:
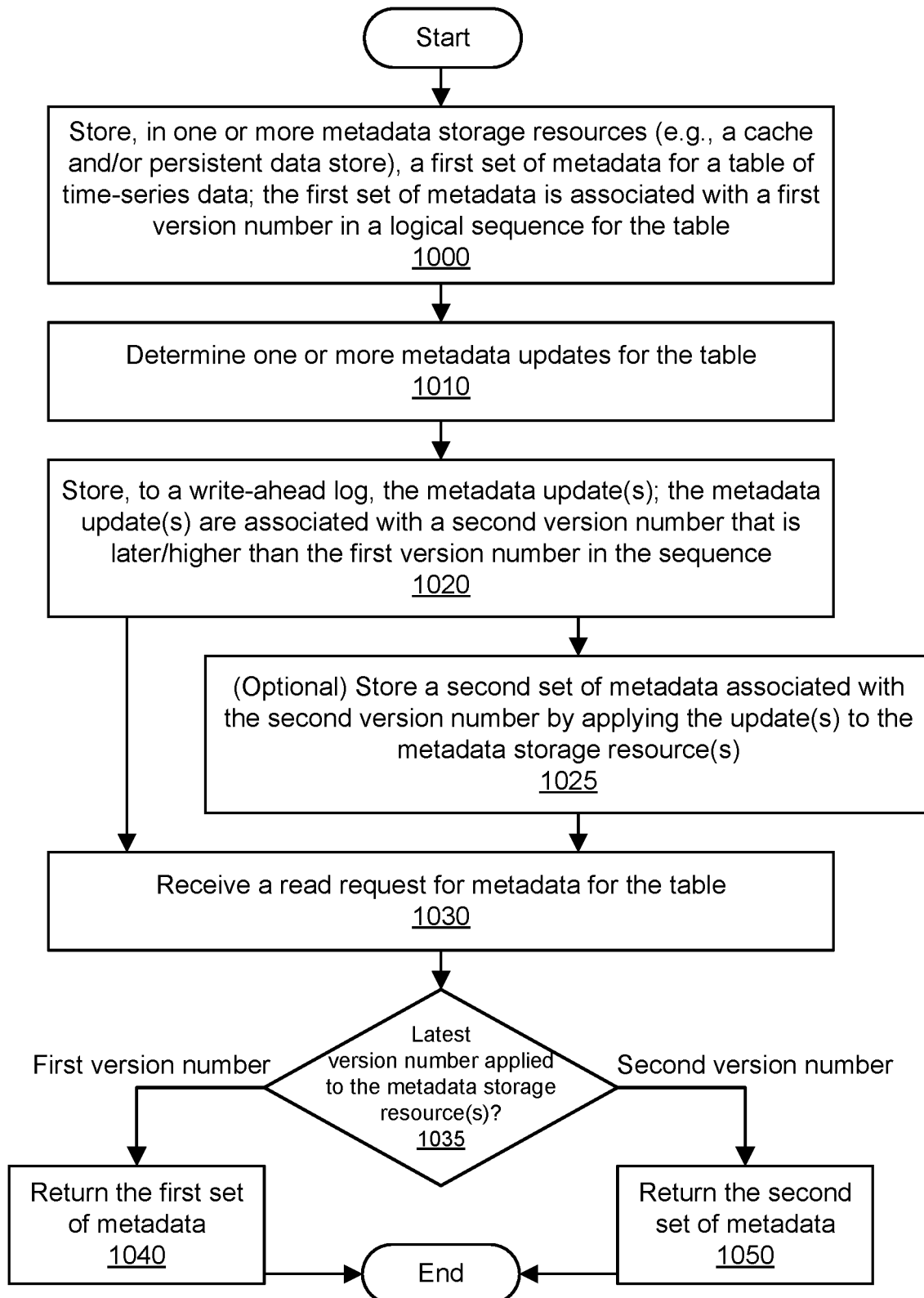
FIG. 10 is a flowchart illustrating a method for versioned metadata management for a time-series database, according to some embodiments.

FIG. 10 is a flowchart illustrating a method for versioned metadata management for a time-series database, according to some embodiments. A metadata service of a distributed time-series database may authoritatively, consistently, and durably store the metadata of time-series data. As shown in 1000, the metadata service may store a first set of metadata for a table of time-series data. The first set of metadata may include, for example, user-defined retention bounds and policies, the mapping of partitions to storage locations in storage tiers, a table schema (e.g., the columns and their data types as inferred upon ingestion and not necessarily explicitly defined by users), the mapping of a measure name to one or more sets of dimension names that may be used to create a time-series view for customers, and so on. The first set of metadata may be stored to one or more metadata storage resources, e.g., a cache node and/or a persistent data store. The first set of metadata may include or be characterized by a first version number in a logical sequence for the table.

As shown in 1010, the time-series database may determine that the metadata for the table has changed. The database may determine one or more metadata updates for the table. The metadata updates may correspond to logical operations such as inserts, updates, deletes, and so on. For example, as new data points are ingested, the time-series database may determine that a new column has been added. As another example, the storage locations of time-series data points may change as partitions are split or merged or as data points are migrated from one storage tier to another storage tier according to a retention policy for the table. As the metadata changes, the use of metadata versioning may ensure that metadata consumers such as a query engine are able to perform tasks correctly, e.g., according to the most recently applied metadata version or a specified version.

As shown in 1020, the metadata service may store data indicative of the one or more metadata updates and/or logical operation(s) for the table. The data indicative of the metadata update(s) may correspond to descriptions of particular logical operations such as inserts, updates, deletes, and so on. The metadata update(s) may be associated with a second metadata version number for the table in the logical sequence for the table. The version numbers may be monotonically increasing such that the second version number may be higher than the first version number, thus representing a later version in the sequence. The version numbers may be determined by the request router or the write-ahead log, and metadata write requests from metadata producers in the time-series database may be routed through the write-ahead log to maintain the ordering. The metadata update(s) may be stored to a write-ahead log before being applied to the metadata storage resource(s) to generate a second set of metadata.

As shown in 1025, the second set of metadata may be stored to one or more metadata storage resources (e.g., a cache node and/or a persistent data store) by a log applier. However, the log applier may not apply the second set of metadata to the metadata storage resource(s) until after a read request is received for the table's metadata. The log applier may apply the logical operation(s) corresponding to the metadata update(s), e.g., one or more inserts, updates, or deletes. The second set of metadata may include the metadata update(s) applied to the first version of the metadata. The second set of metadata may include, for example, updated user-defined retention bounds and policies, an updated mapping of partitions to storage locations in storage tiers, an updated table schema (e.g., the columns and their data types as inferred upon ingestion and not necessarily explicitly defined by users), an updated mapping of a measure name to one or more sets of dimension names that may be used to create a time-series view for customers, and so on. The second set of metadata may include or be associated with the second version number.

As shown in 1030, the metadata service may receive a read request for the table's metadata either before or after the operation shown in 1025. For example, the read request may be associated with a query that seeks to use the metadata to determine the storage locations in one or more data source from which time-series data should be retrieved. As shown in 1035, the metadata service may determine the latest version number in the sequence that has been applied to the metadata storage resource(s). In some embodiments, the latest version number may be stored or otherwise obtained by the request router that receives the read request. The request router may route the read request to an appropriate one of the metadata storage resources, e.g., a cache node or the persistent data store. As shown in 1040, if the first version number is the most recently applied number, then the first set of metadata may be obtained from the metadata storage resource(s) and returned to the caller. As shown in 1050, if the second version number is the most recently applied number, then the second set of metadata may be obtained from the metadata storage resource(s) and returned to the caller. In some embodiments, metadata for a particular version number or point in time may be read if specified in the read request.

Figure 11:
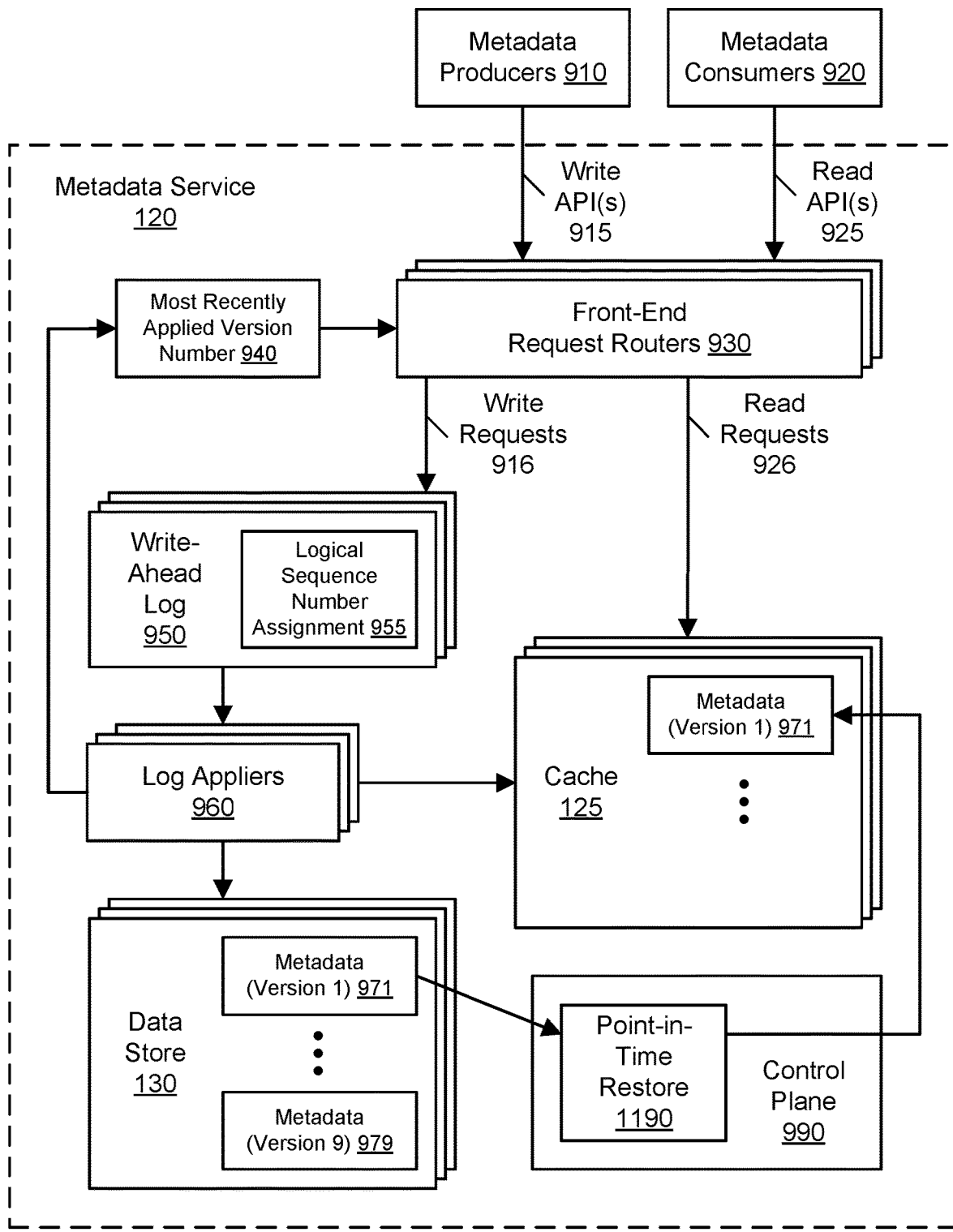
FIG. 11 illustrates further aspects of the example system environment for versioned metadata management for a time-series database, including point-in-time restores using versioned metadata, according to some embodiments.

FIG. 11 illustrates further aspects of the example system environment for versioned metadata management for a time-series database, including point-in-time restores using versioned metadata, according to some embodiments. By implementing multi-version metadata storage, a point-in-time restore 1190 request or replication request may be processed using any version number specified by the request, e.g., to restore a failed cache 125 node. In some embodiments, metadata for a particular version number or a corresponding point in time (e.g., a timestamp) may be read if specified in a read request. Using point-in-time restoration 1190, the service 120 may reconstruct a failed cache 125 from the persistent data store 130 or a different replica of the cache. As shown in the example of FIG. 11, the point-in-time restore 1190 may select an older version of the metadata, e.g., metadata (version 1) 971. The restore operation may copy the particular version of the metadata 971 to the cache node 125 to be restored and begin catching up by replaying newer updates stored using the write-ahead log 950. For example, if a particular update is known to have caused logical corruption of a cache node, then the logical replay from the log 950 may be continued up until that update. The point-in-time restore functionality 1190 may be used to create replicas of storage resources (e.g., a cache 125 node and/or persistent data store 130) having different logical versions of the metadata and/or different selections of the metadata. Different types of read requests 926 for different types of the metadata may be routed to different replicas of the metadata in the storage resources. For example, a read request for a retention policy of a table may be routed by the request routers 930 to the persistent data store 130, and the cache 125 nodes may not necessarily store the retention policy metadata.

Figure 12:
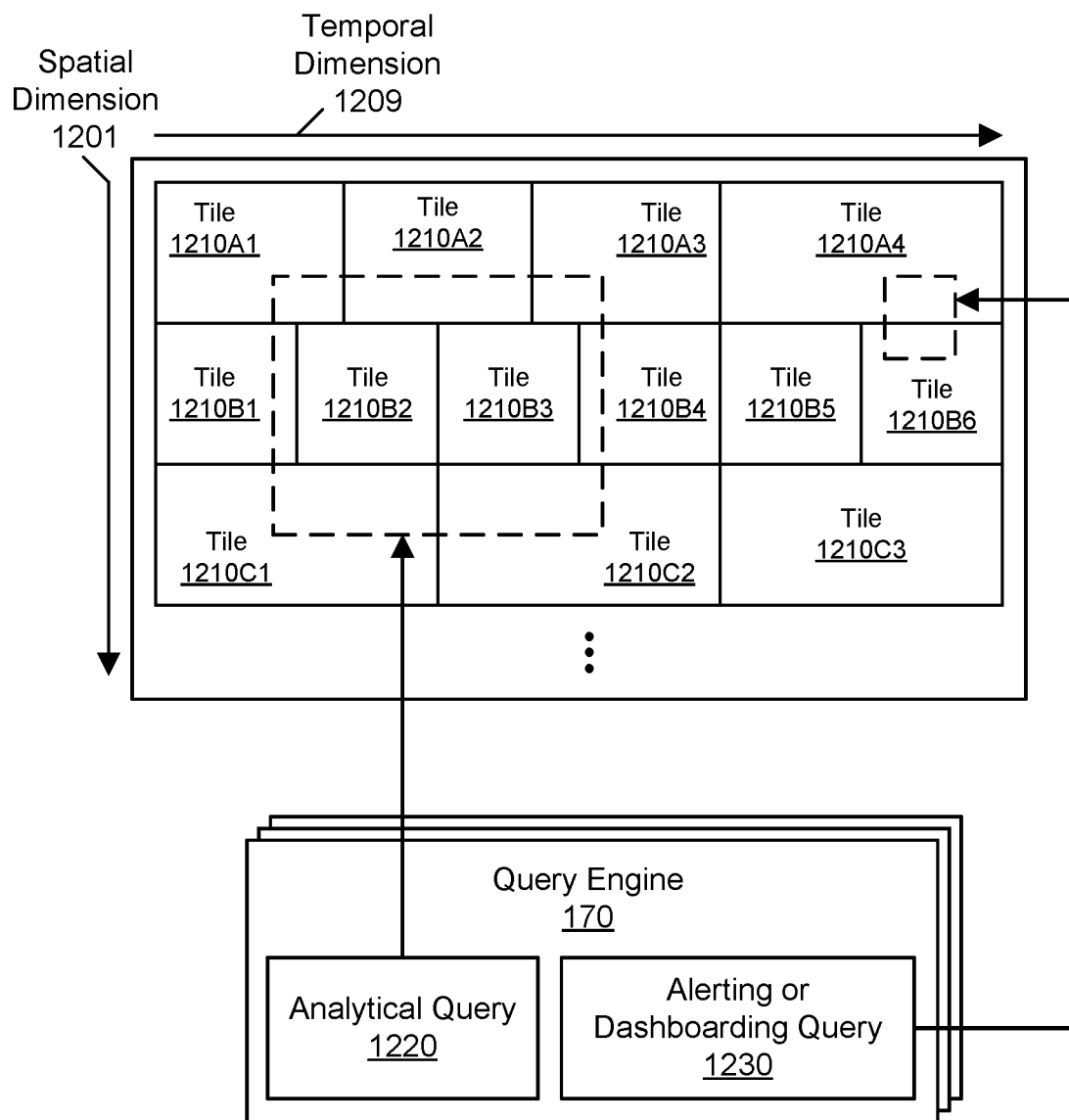
FIG. 12 illustrates examples of bounding boxes for different types of queries across tiles having spatial and temporal dimensions, according to some embodiments.

FIG. 12 illustrates examples of bounding boxes for different types of queries across tiles having spatial and temporal dimensions, according to some embodiments. To maintain high availability and high throughput for queries of time-series data, the query engine 170 may use the metadata service 120 to identify the locations to which queries for particular query predicates (e.g., time and space ranges) are routed. In one or more storage tiers, the database 100 may store time-series data using two-dimensional tiles, e.g., using storage resources such as memory (e.g., RAM) and/or solid-state drives for lower latency of storage and retrieval. Tiles may be partitioned along non-overlapping spatial boundaries, e.g., such that time-series data from one time series is assigned to one tile while time-series data from another time series is assigned to another tile. However, a tile may hold one or more time series. The spatial range may be based on schema-based clustering that seeks to co-locate related time series in the same partition. Tiles may also be partitioned along non-overlapping temporal boundaries. Due to the spatial dimension 1201 and the temporal dimension 1209, tiles may be said to be two-dimensional. As shown in the example of FIG. 12, for a given part of the multi-level hash space, a storage node may write to an open tile 1210A4 that was preceded in time by a tile 1210A3 that was preceded in time by a tile 1210A2 that was preceded in time by a tile 1210A1. Similarly, a storage node may write to an open tile 1210B6 that was preceded in time by a tile 1210B5 that was preceded in time by a tile 1210B4 that was preceded in time by a tile 1210B3 that was preceded in time by a tile 1210B2 that was preceded in time by a tile 1210B1. Additionally, a storage node may write to an open tile 1210C3 that was preceded in time by a tile 1210C2 that was preceded in time by a tile 1210C1.

The query engine 170 may support various types of queries, and the different types of queries may have two-dimensional bounding boxes that tend to vary in size. The bounding box of a query may be based on the query predicates, e.g., a time range and a set of dimensions and measures that corresponds to a range in the multi-level hash space. For example, as shown in FIG. 12, an analytical query 1220 may tend to have a bounding box that spans more tiles. As also shown in FIG. 12, an alerting or dashboarding query 1230 may tend to have a bounding box that spans fewer tiles. Alerting queries may touch small amounts of data (e.g., megabytes) and perform simple computations (such as aggregations). Alerting queries may typically access data in the memory store and may have stringent latency requirements, and users may often submit tens to hundreds of such concurrent queries. Dashboarding queries may include more involved analysis and aggregation. Dashboarding queries may be fewer in volume compared to alerting queries and may have more relaxed latency characteristics. Historical analysis and forecasting queries may be even fewer in volume, though each such query (e.g., analytical query 1220) may be expected to analyze large volumes of historical data spread across several storage tiers.

The metadata service 120 may index metadata efficiently to support low-latency queries of multiple types, including analytical queries, alerting queries, dashboarding queries, and so on. The index 122 stored in the cache 125 may permit the database 100 to efficiently prune out irrelevant partitions when determining which partitions from which to seek query results. As discussed herein, the index 122 may include a hierarchical data structure, e.g., a directed acyclic graph (DAG) or other tree-like data structure such as a two-dimensional B+ tree variant, for storing time-series metadata. The data structure may include nodes that are associated with particular spatial and temporal ranges of time-series data. To perform a query, the metadata service 120 may traverse the data structure in order to identify the storage locations in data sources that correspond to partitions (e.g., tiles) sought by the query.

In some embodiments, the index may be generated using one or more techniques for dimensionality reduction. Using dimensionality reduction, the temporal and spatial dimensions may be mapped to a one-dimensional space which is indexed. In some embodiments, the index may be implemented using an R-tree for dimensionality reduction. The R-tree may group nearby objects and represent these objects with their minimum bounding rectangle in the next higher level of the tree. Because all objects may lie within this bounding rectangle, a query that does not intersect the bounding rectangle may also not intersect any of the contained objects. At the leaf level, each rectangle may describes a single object. At higher levels of the R-tree, the aggregation may include an increasing number of objects. The R-tree may represent a balanced search tree such that all leaf nodes are at the same depth.

In some embodiments, the cache 125 may use an in-memory data structure optimized to support fast identification of which partitions are relevant to a given query. Because each partition is represented by a bounding box, and a query will usually have a disjunction of bounding boxes corresponding to its predicates, the options for such optimized index structures may include an R-tree for each table ID or a skip list storing the partitioned ordered by the partition's start time. To ensure that the cache can tolerate hundreds of millions to billions of data locations per table, these data structures may need to be larger than memory, thus requiring an approach to persist them into durable storage. When using an R-tree, a design similar to B-trees may be in the durable storage, where the B-tree is comprised of pages, and each node in the tree has pointers to its children pages. When a page is accessed, a buffer manager may determine if the page is in memory, and if not, the buffer manager may pull the page from persistent storage. With an R-tree, each R-tree node may be considered as a page stored as a row in a table in a persistent data store. Pointers to pages may represent logical pointers to the table in a persistent data store. Every table ID may have a root pointer which is also stored in another table. When traversing the tree to answer a query, a buffer manager may determine if a referenced page (e.g., a row in a table) is in memory and if not, fetch it. The R-tree may be maintained incrementally as updates are applied. Updated pages may be written back to the backing rows in the table in a persistent data store. The cache 125 may be incrementally bootstrapped by loading the root page of each table and gradually pulling in pages on demand based on accesses. In some embodiments, like B-trees in caching databases, usually the inner nodes of the tree will likely be cached, and thus most requests will be satisfied with a high cache hit ratio.

In some embodiments, the cache 125 may include a local database table in order to leverage the query processing, indexing, and caching capabilities of existing database engines. In some embodiments, each replica of the cache 125 may be backed by an instance of a MySQL database. For the set of table IDs that a cache server is hosting, the cache may create a table in a local database to cache the same data as is stored in the persistent data store 130. Updates may be applied directly on the database. A log applier may update the cache. The local table may be indexed using the native index structures supported by the database, e.g., B-tree indexes on the temporal and spatial attributes or R-tree indexes if using specific spatial extensions such as PostGIS with Postgres. In addition to leveraging the database for caching, storing, and querying tables much larger than memory, and writing checkpoints to persistent storage, the local database approach may use the database functionality to recover from failures. In the event of a cache node failure such as a reboot, the failed cache may be recovered using the local database. If a node is lost, then either the cache may be rebuilt or the database can be stored on block storage volumes which can then be remounted to another host such that the database can be recovered at the new host. By using multiple cache replicas across different availability zones, many of these failures can be hidden not only from an availability perspective but also from a performance perspective because the recovered node may run queries and updates in shadow mode to warm up its cache after recovery is complete.

In some embodiments, some customers of the time-series database 100 may have large spatial partitions with many temporal cuts, while other customers may have many spatial cuts but few temporal cuts. In some embodiments, either spatial or temporal cuts may be prioritized based (at least in part) on prior characteristics of a customer's time-series data. Adaptive partitioning that prioritizes either the spatial or temporal dimension may be combined with dimensionality reduction to yield further efficiencies in traversing the index 122 to build a query plan.

Illustrative Computer System

In at least some embodiments, a computer system that implements a portion or all of one or more of the technologies described herein may include a computer system that includes or is configured to access one or more computer-readable media. FIG. 13 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or nonvolatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 13 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a distributed time-series database that stores time-series data of a plurality of time series, wherein the distributed time-series database comprises a metadata service that stores metadata descriptive of the plurality of time series, and wherein the distributed time-series database comprises one or more processors and one or more memories to store computer-executable instructions that, when executed, cause the one or more processors to:
        store, by the metadata service to one or more metadata storage resources, first metadata descriptive of a table comprising a plurality of data points, wherein the first metadata is associated with a first version number in a logical sequence of metadata versions of the table, wherein individual ones of the metadata versions indicate a schema of the table including columns of the table and data types of the columns;
        determine one or more metadata updates for the table;
        store, to a write-ahead log of the metadata service, data indicative of the one or more metadata updates, wherein the one or more metadata updates are associated with a second version number higher than the first version number in the logical sequence of metadata versions of the table;
        receive, by the metadata service, a read request associated with the table;
        determine, by the metadata service responsive to the read request, a most recent version number in the logical sequence that has been stored in the one or more metadata storage resources; and
        return, by the metadata service responsive to the read request, the first metadata in response to determining that the most recent version number comprises the first version number; or
        return, by the metadata service responsive to the read request, second metadata comprising the one or more metadata updates in response to determining that the most recent version number comprises the second version number.

2. The system as recited in claim 1, wherein the one or more memories store additional computer-executable instructions that, when executed, cause the one or more processors to:
    store, by a log applier of the metadata service to the one or more metadata storage resources, the second metadata based at least in part on the first metadata and the one or more metadata updates, wherein the first metadata and the second metadata are stored concurrently in the one or more metadata storage resources.

3. The system as recited in claim 1, wherein the one or more memories store additional computer-executable instructions that, when executed, cause the one or more processors to:
    receive, by the metadata service, an additional read request, wherein the additional read request comprises a requested version number or a timestamp; and
    return, by the metadata service responsive to the additional read request, the first metadata or the second metadata based at least in part on the requested version number or the timestamp.

4. The system as recited in claim 1, wherein the one or more memories store additional computer-executable instructions that, when executed, cause the one or more processors to:
    determine, by the metadata service, the first metadata or the second metadata based at least in part on a requested version number or timestamp for a point-in-time restore of a particular metadata storage resource; and
    perform, by the metadata service, the point-in-time restore of the particular metadata storage resource, wherein the point-in-time restore comprises copying the first metadata or the second metadata to the particular metadata storage resource based at least in part on the requested version number or the timestamp, and wherein the point-in-time restore comprises applying one or more additional metadata updates from the write-ahead log.

5. A method, comprising:
    storing, by a metadata service of a distributed database to one or more metadata storage resources, first metadata descriptive of a table comprising a plurality of data points, wherein the first metadata is associated with a version number in a logical sequence of metadata versions of the table, wherein individual ones of the metadata versions indicate a schema of the table including columns of the table and data types of the columns;
    determining, by the distributed database, one or more metadata updates for the table;
    storing, by the metadata service, data indicative of the one or more metadata updates, wherein the one or more metadata updates are associated with an additional version number higher than the version number in the logical sequence of metadata versions of the table;
    determining, by the metadata service responsive to a read request, a most recent version number that has been stored in the one or more metadata storage resources, wherein the most recent version number comprises the version number or the additional version number; and
    returning, by the metadata service responsive to the read request, the first metadata or second metadata comprising the one or more metadata updates based at least in part on the most recent version number.

6. The method as recited in claim 5, wherein the one or more metadata updates comprise one or more updates to the schema of the table, and wherein the one or more metadata updates are inferred based at least in part on ingestion or storage of additional data points of the table.

7. The method as recited in claim 5, wherein the one or more metadata updates comprise one or more updates to one or more storage locations for the table in the distributed database.

8. The method as recited in claim 5, further comprising:
receiving, by the metadata service, an additional read request, wherein the additional read request comprises a requested version number or a timestamp; and
returning, by the metadata service responsive to the additional read request, the first metadata or the second metadata based at least in part on the requested version number or the timestamp.

9. The method as recited in claim 5, further comprising:
storing, by the metadata service to the one or more metadata storage resources, the second metadata based at least in part on the one or more metadata updates, wherein the first metadata and the second metadata are stored concurrently in the one or more metadata storage resources.

10. The method as recited in claim 5, further comprising:
determining, by the metadata service, the first metadata or the second metadata based at least in part on a requested version number or a timestamp for a point-in-time restore of a particular metadata storage resource; and
performing, by the metadata service, the point-in-time restore of the particular metadata storage resource, wherein the point-in-time restore comprises copying the first metadata or the second metadata to the particular metadata storage resource based at least in part on the requested version number or the timestamp, and wherein the point-in-time restore comprises applying one or more additional metadata updates from a log.

11. The method as recited in claim 5, wherein the read request is associated with a query associated with spatial and temporal boundaries of requested time-series data in the table, and wherein the method further comprises:
determining, by the metadata service based at least in part on the most recent version number, a plurality of storage locations corresponding to the spatial and temporal boundaries of the query, wherein the plurality of storage locations are determined using an index comprising a hierarchical data structure, and wherein the hierarchical data structure is determined using dimensionality reduction; and
reading, by the distributed database, a plurality of data points of the requested time-series data from the plurality of storage locations.

12. The method as recited in claim 5, wherein the one or more metadata updates are stored to a write-ahead log, wherein the first metadata and the second metadata are stored to the one or more metadata storage resources by a log applier, and wherein the write-ahead log, the log applier, and the one or more metadata storage resources are partitioned according to table identifiers of a plurality of tables of time-series data.

13. One or more non-transitory computer-readable storage media storing program instructions that, when executed on or across one or more processors, perform:
storing, by a metadata service of a distributed time-series database to one or more metadata storage resources, first metadata descriptive of a table comprising a plurality of data points, wherein the first metadata is associated with a version number in a logical sequence of metadata versions of the table, wherein individual ones of the metadata versions indicate a schema of the table including columns of the table and data types of the columns;
determining, by the distributed time-series database, one or more metadata updates for the table based at least in part on ingestion or storage of additional data points of the table;
storing, by the metadata service to a log, data indicative of the one or more metadata updates, wherein the one or more metadata updates are associated with an additional version number later than the version number in the logical sequence of metadata versions of the table;
receiving, by the metadata service, a read request associated with the table;
determining, by the metadata service responsive to the read request, a most recent version number in the logical sequence that has been stored in the one or more metadata storage resources; and
returning, by the metadata service responsive to the read request, the first metadata in response to determining that the most recent version number comprises the version number; or
returning, by the metadata service responsive to the read request, second metadata comprising the one or more metadata updates in response to determining that the most recent version number comprises the additional version number.

14. The one or more non-transitory computer-readable storage media as recited in claim 13, wherein the one or more metadata updates comprise one or more updates to the schema of the table.

15. The one or more non-transitory computer-readable storage media as recited in claim 13, further comprising additional program instructions that, when executed on or across the one or more processors, perform:
receiving, by the metadata service, an additional read request, wherein the additional read request comprises a requested version number or a timestamp; and
returning, by the metadata service responsive to the additional read request, the first metadata or the second metadata based at least in part on the requested version number or the timestamp.

16. The one or more non-transitory computer-readable storage media as recited in claim 13, further comprising additional program instructions that, when executed on or across the one or more processors, perform:
storing, by the metadata service to the one or more metadata storage resources, the second metadata based at least in part on the first metadata and the one or more metadata updates, wherein the first metadata and the second metadata are stored concurrently in the one or more metadata storage resources.

17. The one or more non-transitory computer-readable storage media as recited in claim 13, further comprising additional program instructions that, when executed on or across the one or more processors, perform:
determining, by the metadata service, the first metadata or the second metadata based at least in part on a requested version number or a timestamp for a point-in-time restore of a particular metadata storage resource; and
performing, by the metadata service, the point-in-time restore of the particular metadata storage resource, wherein the point-in-time restore comprises copying the first metadata or the second metadata to the particular metadata storage resource based at least in part on the requested version number or a timestamp, and wherein the point-in-time restore comprises applying one or more additional metadata updates from the log.

18. The one or more non-transitory computer-readable storage media as recited in claim 13, wherein the read request is associated with a query associated with spatial and temporal boundaries of requested time-series data in the table, and wherein the one or more non-transitory computer-readable storage media further comprise additional program instructions that, when executed on or across the one or more processors, perform:

- determining, by the metadata service based at least in part on the most recent version number, a plurality of storage locations corresponding to the spatial and temporal boundaries of the query, wherein the plurality of storage locations are determined using an index comprising a hierarchical data structure, and wherein the hierarchical data structure is determined using dimensionality reduction that maps a spatial dimension and a temporal dimension to a single dimension; and
- reading, by the distributed time-series database, a plurality of data points of the requested time-series data from the plurality of storage locations.

19. The one or more non-transitory computer-readable storage media as recited in claim 18, wherein the hierarchical data structure comprises an R-tree.

20. The one or more non-transitory computer-readable storage media as recited in claim 13, wherein the one or more metadata storage resources comprise a first metadata storage resource and a second metadata storage resource, wherein the first metadata storage resource stores a first selection of metadata for the table, wherein the second metadata storage resource stores a second selection of metadata for the table, and wherein the second selection differs at least in part from the first selection.

\* \* \* \* \*